(12) United States Patent
Wang et al.

(10) Patent No.: US 12,483,139 B2
(45) Date of Patent: Nov. 25, 2025

(54) MULTI-LEVEL CONVERSION CIRCUIT AND CONTROL METHOD FOR FLYING CAPACITOR VOLTAGE THEREOF

(71) Applicant: Delta Electronics (Shanghai) Co., Ltd., Shanghai (CN)

(72) Inventors: Yichao Wang, Shanghai (CN); Yuhua Hu, Shanghai (CN); Kai Dong, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 139 days.

(21) Appl. No.: 18/372,559

(22) Filed: Sep. 25, 2023

(65) Prior Publication Data
US 2024/0162818 A1    May 16, 2024

(30) Foreign Application Priority Data
Nov. 9, 2022 (CN) .......................... 202211401242.2

(51) Int. Cl.
*H02M 1/088* (2006.01)
*H02M 1/00* (2006.01)
*H02M 3/158* (2006.01)

(52) U.S. Cl.
CPC ....... *H02M 3/1584* (2013.01); *H02M 1/0012* (2021.05); *H02M 1/0095* (2021.05); *H02M 1/088* (2013.01)

(58) Field of Classification Search
CPC ............. H02M 3/1584; H02M 1/0012; H02M 1/0095; H02M 1/088
See application file for complete search history.

(56) References Cited

U.S. PATENT DOCUMENTS

| | | | |
|---|---|---|---|
| 9,608,532 | B2 | 3/2017 | Wong et al. |
| 2014/0233279 | A1 | 8/2014 | Kondo et al. |
| 2017/0310105 | A1 | 10/2017 | Shen et al. |
| 2020/0220471 | A1 | 7/2020 | Kikuchi et al. |

(Continued)

FOREIGN PATENT DOCUMENTS

| | | |
|---|---|---|
| CN | 109687704 B | 8/2020 |
| CN | 112134443 B | 9/2021 |

(Continued)

*Primary Examiner* — Adolf D Berhane
(74) *Attorney, Agent, or Firm* — KIRTON McCONKIE; Evan R. Witt

(57) ABSTRACT

A multi-level conversion circuit and a control method for flying capacitor voltage thereof are provided. In the multi-level conversion circuit, each flying capacitor is connected between a common connection node of the lower switches connected therewith and a common connection node of the upper switches connected therewith. When the conversion circuit works in a DCM, the control method includes steps of: (a) determining the main switch and synchronous rectification switch of the lower and upper switches; (b) acquiring an adjustment value corresponding to each flying capacitor; and (c) adjusting a duty ratio of the main switch according to the adjustment value corresponding to the flying capacitor connected therewith, wherein the adjustment trend of the duty ratio under $D<(N-2)/(N-1)$ is opposite to that under $(N-2)/(N-1)<D\leq 1$, and D is the duty ratio before the adjustment.

16 Claims, 22 Drawing Sheets

(56) References Cited

U.S. PATENT DOCUMENTS

| | | |
|---|---|---|
| 2021/0344277 A1 | 11/2021 | Toyoda et al. |
| 2021/0376754 A1 | 12/2021 | Jang et al. |
| 2022/0190712 A1 | 6/2022 | Chen et al. |
| 2022/0344946 A1 | 10/2022 | Wang et al. |
| 2023/0412090 A1 | 12/2023 | Abdelhamid et al. |
| 2024/0162805 A1* | 5/2024 | Dong ................. H02M 1/0032 |
| 2024/0162834 A1* | 5/2024 | Wang ................. H02M 7/2195 |
| 2025/0079974 A1* | 3/2025 | Hu ......................... H02M 7/25 |

FOREIGN PATENT DOCUMENTS

| | | |
|---|---|---|
| CN | 113541473 A | 10/2021 |
| TW | 201303923 A | 1/2013 |

* cited by examiner

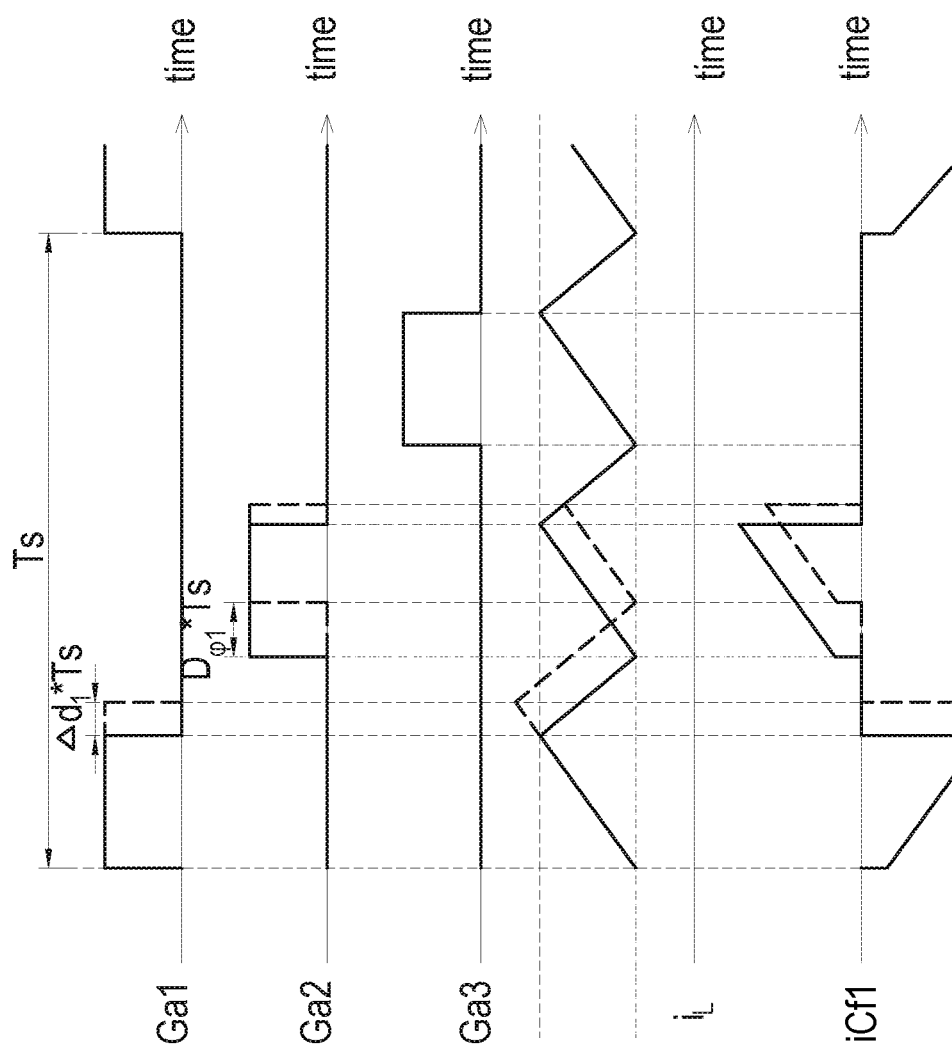

MULTI-LEVEL CONVERSION CIRCUIT AND CONTROL METHOD FOR FLYING CAPACITOR VOLTAGE THEREOF

CROSS-REFERENCE TO RELATED APPLICATION

This application claims priority to China Patent Application No. 202211401242.2, filed on Nov. 9, 2022, the entire contents of which are incorporated herein by reference for all purposes.

FIELD OF THE INVENTION

The present disclosure relates to a multi-level conversion circuit and a control method thereof, and more particularly to a multi-level conversion circuit and a control method for flying capacitor voltage thereof.

BACKGROUND OF THE INVENTION

In the multi-level circuit including flying capacitors, the voltage across flying capacitor has to be controlled and stabilized for avoiding affecting the normal working status of circuit or even damaging the switches due to overvoltage. Conventionally, the polarity of the current in the multi-level circuit is detected to determine whether to increase or decrease flying capacitor voltage, so as to make the flying capacitor voltage stable. However, in the application of AC-DC conversion, the current ripple caused by high-frequency switching would make the current direction vary over and over again under light load. Further, the sampling error also exists. Consequently, it may be easy for the controller to misjudge the polarity of the present current, resulting in affecting the reliability of the balance control for flying capacitor voltage.

Therefore, there is a need of providing a multi-level conversion circuit and a control method for flying capacitor voltage thereof in order to overcome the drawbacks of the conventional technologies.

SUMMARY OF THE INVENTION

The present disclosure provides a multi-level conversion circuit and a control method for flying capacitor voltage thereof. The multi-level conversion circuit and the control method may be applied in CCM (continuous conduction mode) and DCM (discontinuous conduction mode) to balance the flying capacitor voltage through controlling the duty ratio of switch and the phase-shift angle between switches without determining the polarity of current. Consequently, the charging and discharging logic of the flying capacitor is prevented from being affected by misjudging the polarity of current, thereby improving the reliability of the balance control for flying capacitor voltage.

In accordance with an aspect of the present disclosure, a control method for flying capacitor voltage applied in a multi-level DC-DC conversion circuit is provided. The number of levels of the multi-level DC-DC conversion circuit is N which is an integer greater than or equal to three. The multi-level DC-DC conversion circuit includes a positive input terminal, a negative input terminal, an inductor, N−1 lower switches, N−1 upper switches, N−2 flying capacitors, a positive output terminal and a negative output terminal. The positive input terminal and the negative input terminal are configured to receive an input voltage, and the positive output terminal and the negative output terminal are configured to provide an output voltage. A first terminal of the inductor is electrically connected to the positive input terminal. The N−1 lower switches are connected in series between a second terminal of the inductor and the negative output terminal, and the first lower switch and the (N−1)th lower switch are coupled to the second terminal of the inductor and the negative output terminal respectively. The N−1 upper switches are connected in series between the second terminal of the inductor and the positive output terminal, and the first upper switch and the (N−1)th upper switch are coupled to the second terminal of the inductor and the positive output terminal respectively. The kth flying capacitor is connected between a common connection node of the kth lower switch and the (k+1)th lower switch and a common connection node of the kth upper switch and the (k+1)th upper switch, and k is a positive integer less than or equal to N−2. The negative output terminal is electrically connected to the negative input terminal. When the multi-level DC-DC conversion circuit works in a DCM, the control method includes steps of: (a) determining the N−1 lower switches as N−1 main switches, and determining the N−1 upper switches as N−1 synchronous rectification switches; (b) acquiring an adjustment value corresponding to each of the N−2 flying capacitors according to an actual voltage and a reference voltage of the flying capacitor; and (c) adjusting a duty ratio of the kth main switch according to the adjustment value corresponding to the flying capacitor connected to the kth main switch, and adjusting a duty ratio of the (N−1)th main switch according to the adjustment value corresponding to the flying capacitor connected to the (N−1)th main switch, wherein regarding each of the N−1 main switches, the duty ratio is adjusted by a first adjustment amount when $D<(N-2)/(N-1)$, the duty ratio is adjusted by a second adjustment amount when $(N-2)/(N-1)<D\leq 1$, a product of the first adjustment amount and the second adjustment amount is negative, and D is the duty ratio of the N−1 main switches before the adjustment.

In accordance with another aspect of the present disclosure, a multi-level DC-DC conversion circuit is provided. The number of levels of the multi-level DC-DC conversion circuit is N which is an integer greater than or equal to three. The multi-level DC-DC conversion circuit includes a positive input terminal, a negative input terminal, a positive output terminal, a negative output terminal, an inductor, N−1 lower switches, N−1 upper switches, N−2 flying capacitors and a control unit. The positive input terminal and the negative input terminal are configured to receive an input voltage, and the positive output terminal and the negative output terminal are configured to provide an output voltage. The negative output terminal is electrically connected to the negative input terminal. A first terminal of the inductor is electrically connected to the positive input terminal. The N−1 lower switches are connected in series between a second terminal of the inductor and the negative output terminal, and the first lower switch and the (N−1)th lower switch are coupled to the second terminal of the inductor and the negative output terminal respectively. The N−1 upper switches are connected in series between the second terminal of the inductor and the positive output terminal, and the first upper switch and the (N−1)th upper switch are coupled to the second terminal of the inductor and the positive output terminal respectively. The kth flying capacitor is connected between a common connection node of the kth lower switch and the (k+i)th lower switch and a common connection node of the kth upper switch and the (k+i)th upper switch, and k is a positive integer less than or equal to N−2. When the multi-level DC-DC conversion circuit works in a DCM, the control unit is configured to: determine the N−1 lower switches as N−1 main switches, and determine the N−1 upper switches as N−1 synchronous rectification switches; acquire an adjustment value corresponding to each of the N−2 flying capacitors according to an actual voltage and a reference voltage of the flying capacitor; and adjust a duty ratio of the kth main switch according to the adjustment value corresponding to the flying capacitor connected to the kth main switch, and adjust a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

In accordance with another aspect of the present disclosure, a control method for flying capacitor voltage applied in a multi-level AC-DC conversion circuit is provided. The number of levels of the multi-level AC-DC conversion circuit is N which is an integer greater than or equal to three. The multi-level AC-DC conversion circuit includes a first input terminal, a second input terminal, an inductor, N−1 lower switches, N−1 upper switches, N−2 flying capacitors, a first output terminal, a second output terminal, a first input switch and a second input switch. The first input terminal and the second input terminal are configured to receive an input voltage, and the first output terminal and the second output terminal are configured to provide an output voltage. A first terminal of the inductor is electrically connected to the second input terminal. The N−1 lower switches are connected in series between a second terminal of the inductor and the second output terminal, and the first lower switch and the (N−1)th lower switch are coupled to the second terminal of the inductor and the second output terminal respectively. The N−1 upper switches are connected in series between the second terminal of the inductor and the first output terminal, and the first upper switch and the (N−1)th upper switch are coupled to the second terminal of the inductor and the first output terminal respectively. The kth flying capacitor is connected between a common connection node of the kth lower switch and the (k+1)th lower switch and a common connection node of the kth upper switch and the (k+1)th upper switch, and k is a positive integer less than or equal to N−2. The first input switch is coupled between the first input terminal and the first output terminal, the second input switch is coupled between the first input terminal and the second output terminal, and a control signal of the first input switch is complementary to a control signal of the second input switch. When the multi-level AC-DC conversion circuit works in a DCM, the control method includes steps of: (a) determining the N−1 lower switches and the N−1 upper switches as N−1 main switches and N−1 synchronous rectification switches respectively when a potential at the first input terminal being lower than a potential at the second input terminal, and determining the N−1 upper switches and the N−1 lower switches as N−1 main switches and N−1 synchronous rectification switches respectively when the potential at the first input terminal being higher than the potential at the second input terminal; (b) acquiring an adjustment value corresponding to each of the N−2 flying capacitors according to an actual voltage and a reference voltage of the flying capacitor; and (c) adjusting a duty ratio of the kth main switch according to the adjustment value corresponding to the flying capacitor connected to the kth main switch, and adjusting a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

In accordance with another aspect of the present disclosure, a multi-level AC-DC conversion circuit is provided. The number of levels of the multi-level AC-DC conversion circuit is N which is an integer greater than or equal to three. The multi-level AC-DC conversion circuit includes a first input terminal, a second input terminal, a first output terminal, a second output terminal, an inductor, N−1 lower switches, N−1 upper switches, N−2 flying capacitors, a first input switch, a second input switch and a control unit. The first input terminal and the second input terminal are configured to receive an input voltage, and the first output terminal and the second output terminal are configured to provide an output voltage. A first terminal of the inductor is electrically connected to the second input terminal. The N−1 lower switches are connected in series between a second terminal of the inductor and the second output terminal, and the first lower switch and the (N−1)th lower switch are coupled to the second terminal of the inductor and the second output terminal respectively. The N−1 upper switches are connected in series between the second terminal of the inductor and the first output terminal, and the first upper switch and the (N−1)th upper switch are coupled to the second terminal of the inductor and the first output terminal respectively. The kth flying capacitor is connected between a common connection node of the kth lower switch and the (k+1)th lower switch and a common connection node of the kth upper switch and the (k+i)th upper switch, and k is a positive integer less than or equal to N−2. The first input switch is coupled between the first input terminal and the first output terminal, the second input switch is coupled between the first input terminal and the second output terminal, and a control signal of the first input switch is complementary to a control signal of the second input switch. When the multi-level AC-DC conversion circuit works in a DCM, the control unit is configured to: determine the N−1 lower switches and the N−1 upper switches as N−1 main switches and N−1 synchronous rectification switches respectively when a potential at the first input terminal is lower than a potential at the second input terminal, and determine the N−1 upper switches and the N−1 lower switches as N−1 main switches and N−1 synchronous rectification switches respectively when the potential at the first input terminal is higher than the potential at the second input terminal; acquire an adjustment value corresponding to each of the N−2 flying capacitors according to an actual voltage and a reference voltage of the flying capacitor; and adjust a duty ratio of the kth main switch according to the adjustment value corresponding to the flying capacitor connected to the kth main switch, and adjust a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

The above contents of the present disclosure will become more readily apparent to those ordinarily skilled in the art after reviewing the following detailed description and accompanying drawings, in which:

BRIEF DESCRIPTION OF THE DRAWINGS

FIG. 13A schematically shows the waveforms of the multi-level AC-DC conversion circuit of FIG. 12 working in CCM with D≤⅓;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The multi-level conversion circuit of the present disclosure may include a multi-level DC-DC conversion circuit and a multi-level AC-DC conversion circuit, which are exemplified according to FIG. 1 and FIG. 2 respectively as follows.

Figure 1:
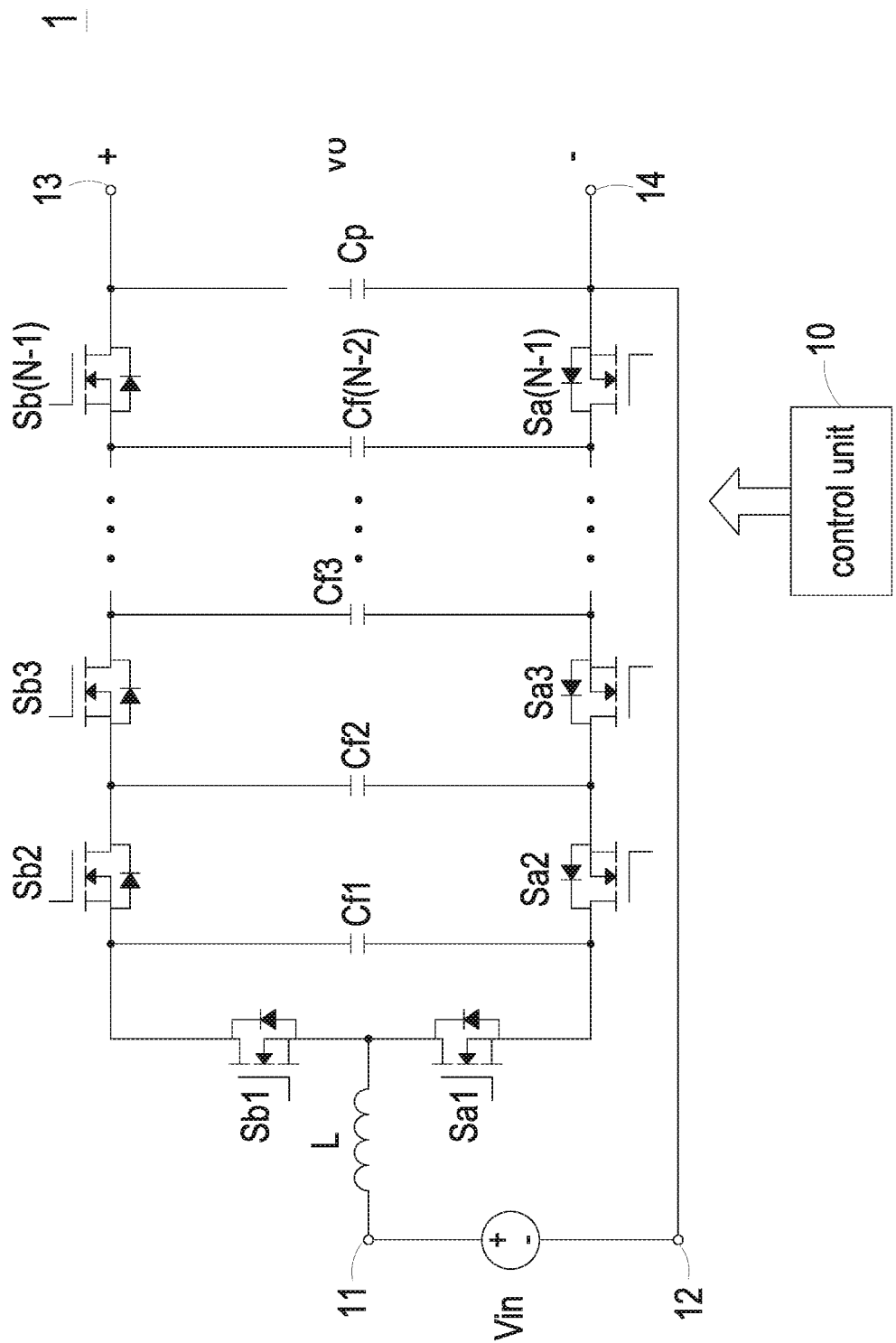
FIG. 1 is a schematic circuit diagram illustrating a multi-level DC-DC conversion circuit according to an embodiment of the present disclosure.

FIG. 1 is a schematic circuit diagram illustrating a multi-level DC-DC conversion circuit according to an embodiment of the present disclosure. As shown in FIG. 1, the number of levels of the multi-level DC-DC conversion circuit 1 is N, which is an integer greater than or equal to three. The multi-level DC-DC conversion circuit 1 includes a positive input terminal 11, a negative input terminal 12, a positive output terminal 13, a negative output terminal 14, an inductor L, N−1 lower switches Sa1, Sa2, . . . , Sa(N−1), N−1 upper switches Sb1, Sb2, . . . , Sb(N−1), N−2 flying capacitors Cf1, Cf2, . . . , Cf(N−2), and a control unit 10. The positive input terminal 11 and the negative input terminal 12 are configured to connect to a power source (DC power source) for receiving an input voltage Vin. The positive output terminal 13 and the negative output terminal 14 are configured to provide an output voltage Vo, and the negative output terminal 14 is electrically connected to the negative input terminal 12. A first terminal of the inductor L is electrically connected to the positive input terminal 11. All the lower switches Sa1, Sa2, . . . , Sa(N−1) are connected in series between a second terminal of the inductor L and the negative output terminal 14, and the first lower switch Sa1 and the (N−1)th lower switch Sa(N−1) are coupled to the second terminal of the inductor L and the negative output terminal 14 respectively. All the upper switches Sb1, Sb2, . . . , Sb(N−1) are connected in series between the second terminal of the inductor L and the positive output terminal 13, and the first upper switch Sb1 and the (N−1)th upper switch Sb(N−1) is coupled to the second terminal of the inductor L and the positive output terminal 13 respectively. In all the N−2 flying capacitors Cf1, Cf2, . . . , Cf(N−2), the kth flying capacitor Cfk is connected between a common connection node of the kth lower switch Sak and the (k+1)th lower switch Sa(k+1) and a common connection node of the kth upper switch Sbk and the (k+1)th upper switch Sb(k+1), where k is a positive integer less than or equal to N−2 (i.e., k=1, 2, . . . , (N−2)). The control unit 10 is configured to control the operation of all switches in the multi-level DC-DC conversion circuit 1.

During the process of controlling the switches, the control unit 10 determines all the N−1 lower switches Sa1, Sa2, ..., Sa(N−1) as main switches, and determines all the N−1 upper switches Sb1, Sb2, ..., Sb(N−1) as synchronous rectification switches. In an embodiment, the multi-level DC-DC conversion circuit 1 further includes an output capacitor Cp connected between the positive output terminal 13 and the negative output terminal 14 to make the output voltage stable.

Figure 2:
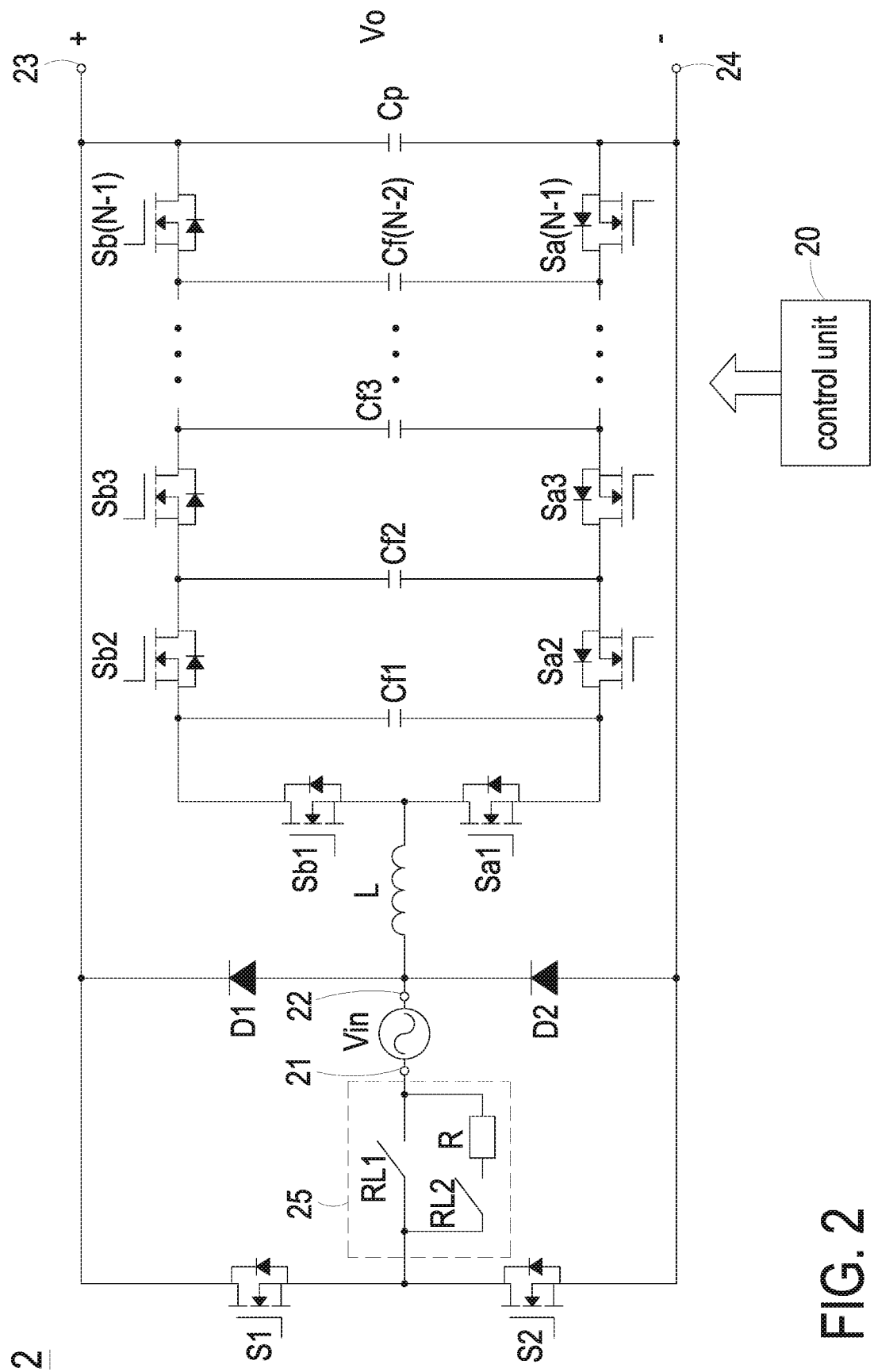
FIG. 2 is a schematic circuit diagram illustrating a multi-level AC-DC conversion circuit according to an embodiment of the present disclosure.

FIG. 2 is a schematic circuit diagram illustrating a multi-level AC-DC conversion circuit according to an embodiment of the present disclosure. As shown in FIG. 2, the number of levels of the multi-level AC-DC conversion circuit 2 is N. The multi-level AC-DC conversion circuit 2 includes a first input terminal 21, a second input terminal 22, a first output terminal 23, a second output terminal 24, an inductor L, N−1 lower switches Sa1, Sa2, ..., Sa(N−1), N−1 upper switches Sb1, Sb2, ..., Sb(N−1), N−2 flying capacitors Cf1, Cf2, ..., Cf(N−2), a first input switch S1, a second input switch S2, and a control unit 20. The first input terminal 21 and the second input terminal 22 are configured to connect to a power source (AC power source) for receiving an input voltage Vin. The first output terminal 23 and the second output terminal 24 are configured to provide an output voltage Vo. A first terminal of the inductor L is electrically connected to the second input terminal 22. All the lower switches Sa1, Sa2, ..., Sa(N−1) are connected in series between a second terminal of the inductor L and the second output terminal 24, and the first lower switch Sa1 and the (N−1)th lower switch Sa(N−1) are coupled to the second terminal of the inductor L and the second output terminal 24 respectively. All the upper switches Sb1, Sb2, ..., Sb(N−1) are connected in series between the second terminal of the inductor L and the first output terminal 23, and the first upper switch Sb1 and the (N−1)th upper switch Sb(N−1) are coupled to the second terminal of the inductor L and the first output terminal 23 respectively. In all the N−2 flying capacitors Cf1, Cf2, ..., Cf(N−2), the kth flying capacitor Cfk is connected between a common connection node of the kth lower switch Sak and the (k+1)th lower switch Sa(k+1) and a common connection node of the kth upper switch Sbk and the (k+1)th upper switch Sb(k+1). The first input switch S1 is coupled between the first input terminal 21 and the first output terminal 23, and the second input switch S2 is coupled between the first input terminal 21 and the second output terminal 24. The control signal of first input switch S1 is complementary to the control signal of second input switch S2. The control unit 20 is configured to control the operation of all switches in the multi-level AC-DC conversion circuit 2.

During the process of controlling the switches, when the potential at the first input terminal 21 is lower than the potential at the second input terminal 22, the control unit 20 determines the N−1 lower switches Sa1, Sa2, ..., Sa(N−1) and the N−1 upper switches Sb1, Sb2, ..., Sb(N−1) as N−1 main switches and N−1 synchronous rectification switches respectively. Alternatively, when the potential at the first input terminal 21 is higher than the potential at the second input terminal 22, the control unit 20 determines the N−1 upper switches Sb1, Sb2, ..., Sb(N−1) and the N−1 lower switches Sa1, Sa2, ..., Sa(N−1) as N−1 main switches and N−1 synchronous rectification switches respectively. In detail, the first input switch S1 and the second input switch S2 are switched according to the polarity of the input voltage Vin. When the input voltage Vin is in the negative half cycle (i.e., the potential at the first input terminal 21 is higher than the potential at the second input terminal 22), the first input switch S1 and the second input switch S2 are in the on state and the off state respectively, and the control unit 20 determines all the N−1 upper switches Sb1, Sb2, ..., Sb(N−1) as main switches and determines all the N−1 lower switches Sa1, Sa2, ..., Sa(N−1) as synchronous rectification switches. On the contrary, when the input voltage Vin is in the positive half cycle (i.e., the potential at the first input terminal 21 is lower than the potential at the second input terminal 22), the first input switch S1 and the second input switch S2 are in the off state and the on state respectively, and the control unit 20 determines all the N−1 lower switches Sa1, Sa2, ..., Sa(N−1) as main switches and determines all the N−1 upper switches Sb1, Sb2, ..., Sb(N−1) as synchronous rectification switches.

In an embodiment, the multi-level AC-DC conversion circuit 2 further includes an output capacitor Cp connected between the first output terminal 23 and the second output terminal 24 to make the output voltage stable. In an embodiment, the multi-level AC-DC conversion circuit 2 further includes diodes D1 and D2. The cathode terminal and the anode terminal of the diode D1 are electrically connected to the first output terminal 23 and the second input terminal 22 respectively. The cathode terminal and the anode terminal of the diode D2 are electrically connected to the second input terminal 22 and the second output terminal 24 respectively. In an embodiment, the multi-level AC-DC conversion circuit 2 further includes an inrush current limiter 25. The inrush current limiter 25 is utilized to limit the inrush current for preventing the inrush current from damaging the components of the multi-level AC-DC conversion circuit 2. The inrush current limiter 25 includes a resistor R and switches RL1 and RL2. Two terminals of the switch RL1 are electrically connected to the first input terminal 21 and a common connection node of the first input switch S1 and the second input switch S2 respectively. The branch circuit formed by the resistor R and the switch RL2 connected in series is connected between the two terminals of the switch RL1.

As shown in FIG. 1 and FIG. 2, the main difference between the multi-level DC-DC conversion circuit 1 and the multi-level AC-DC conversion circuit 2 is described in detail as follows. In the multi-level DC-DC conversion circuit 1, the lower switch and the upper switch are fixed to be the main switch and the synchronous rectification switch respectively. The multi-level DC-DC conversion circuit 1 is switched to work in CCM or DCM according to the variation of the input voltage Vin, output voltage Vo and load. While in the multi-level AC-DC conversion circuit 2, according to the polarity of the input voltage Vin, one and the other one of the lower switch and upper switch are respectively determined as the main switch and the synchronous rectification switch. The multi-level AC-DC conversion circuit 2 is switched to work in CCM or DCM according to the variation of the input voltage Vin, output voltage Vo and load.

Figure 3:
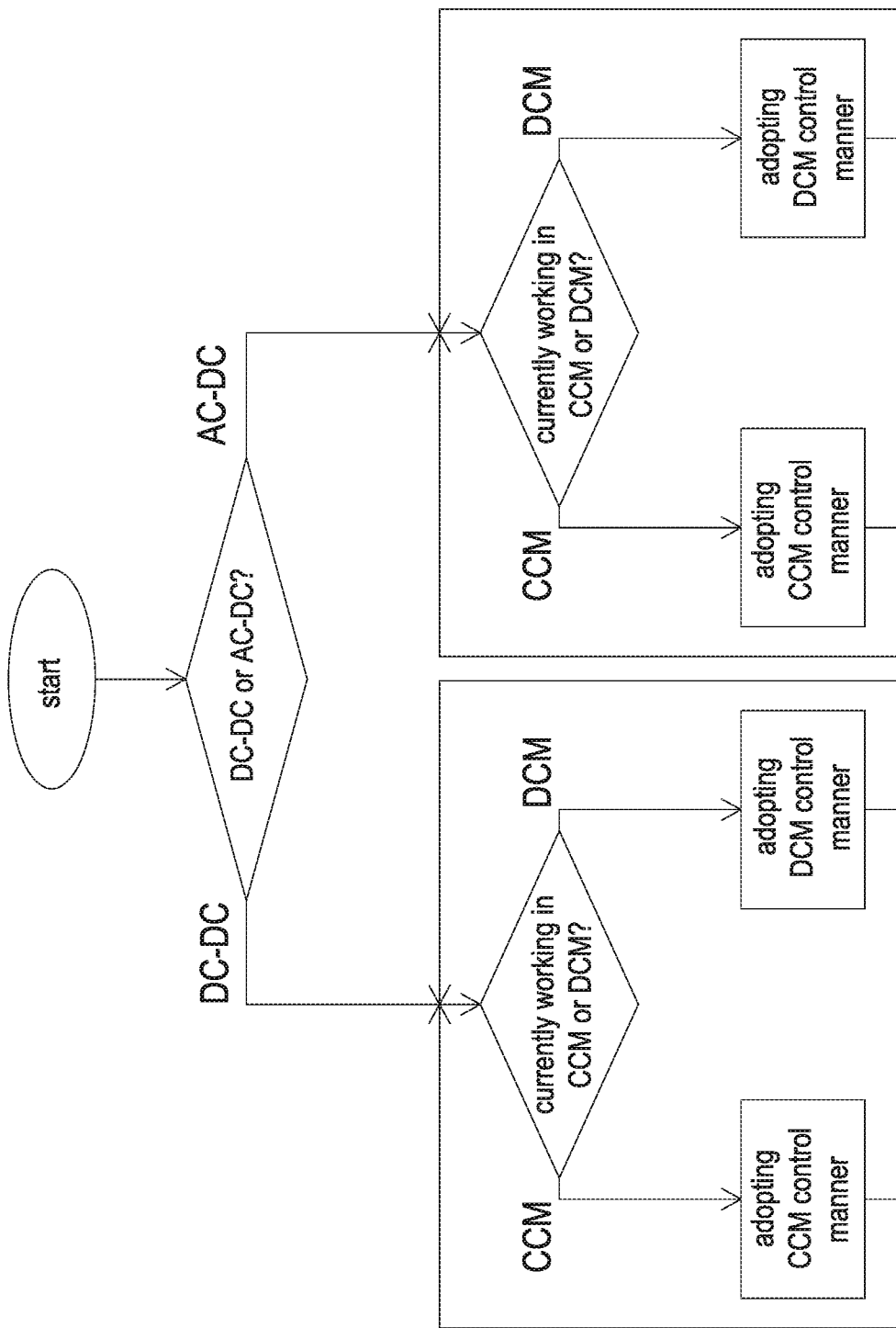
FIG. 3 schematically shows the control strategy for the multi-level conversion circuit of the present disclosure.

Corresponding to the above-mentioned difference between the multi-level DC-DC conversion circuit 1 and the multi-level AC-DC conversion circuit 2, the control strategy for the multi-level conversion circuit of the present disclosure is shown in FIG. 3. Firstly, whether the multi-level conversion circuit is the multi-level DC-DC conversion circuit 1 or the multi-level AC-DC conversion circuit 2 is determined. If the multi-level conversion circuit is the multi-level DC-DC conversion circuit 1, whether the multi-level DC-DC conversion circuit 1 currently works in CCM or DCM is further determined. If the multi-level DC-DC conversion circuit 1 works in CCM, the CCM control method is adopted; and if the multi-level DC-DC conversion circuit 1 works in DCM, the DCM control method is adopted. In addition, if the multi-level conversion circuit is the multi-level AC-DC conversion circuit 2, whether the multi-level AC-DC conversion circuit 2 currently works in CCM or DCM is further determined. If the multi-level AC-DC conversion circuit 2 works in CCM, the CCM control method is adopted; and if the multi-level AC-DC conversion circuit 2 works in DCM, the DCM control method is adopted. Since the multi-level DC-DC conversion circuit 1 and the multi-level AC-DC conversion circuit 2 may be switched to work in CCM or DCM, whether the multi-level DC-DC conversion circuit 1 or multi-level AC-DC conversion circuit 2 currently works in CCM or DCM has to be determined again after performing the CCM or DCM control method for a period of time (e.g., one switching cycle), so as to adopt the control method corresponding to the working mode at present.

The way of determining whether the multi-level DC-DC conversion circuit 1 and the multi-level AC-DC conversion circuit 2 currently work in CCM or DCM is specifically exemplified as follows. This determining way can be applied to the multi-level DC-DC conversion circuit 1 and the multi-level AC-DC conversion circuit 2, and thus the term "conversion circuit" is used in the description below to represent these two kinds of conversion circuits. Firstly, the theoretical values of duty ratio of the main switch of the conversion circuit working in CCM and DCM are calculated according to the following equation:

$$D_{CCM} = 1 - \frac{V_{in}}{V_o}$$

$$D_{DCM} = \frac{hT_\theta}{Ts} + \left[ \frac{2Li_L}{T_s V_o} \frac{D_{CCM} - \frac{hT_\theta}{Ts}}{\frac{(h+1)T_\theta}{Ts} - D_{CCM}} \right]^{\frac{1}{2}},$$

$$\frac{D_{CCM}T_S}{T_\theta} - 1 \le h < \frac{D_{CCM}T_S}{T_\theta}$$

$$T_\theta = Ts/(N-1),$$

where $D_{CCM}$ is the theoretical value of duty ratio of the main switch when the conversion circuit works in CCM, To is the time length corresponding to the phase-shift angle θ between any two neighboring main switches, θ=360°/(N−1), Ts is the switching cycle of the main switch, h is an integer, $D_{DCM}$ is the theoretical value of duty ratio of the main switch when the conversion circuit works in DCM, and $i_L$ is the current flowing through the inductor L.

The conversion circuit works in CCM when $D_{CCM} \le D_{DCM}$, and the conversion circuit works in DCM when $D_{CCM} > D_{DCM}$.

In an embodiment, whether the conversion circuit works in CCM or DCM may be determined by detecting if the current flowing through the inductor L crosses zero. If it is detected that the current flowing through the inductor L crosses zero, the conversion circuit currently works in DCM, and the DCM control method is adopted. If it is detected that the current flowing through the inductor L doesn't cross zero, the conversion circuit currently works in CCM, and the CCM control method is adopted. It is noted that whether the current flowing through the inductor L crosses zero may be determined by detecting the current flowing through the inductor L directly or by detecting other parameters, which can reflect whether the current crosses zero, in the conversion circuit.

The CCM control method adopted in the multi-level DC-DC conversion circuit 1 and the CCM control method adopted in the multi-level AC-DC conversion circuit 2 are the same, and the DCM control method adopted in the multi-level DC-DC conversion circuit 1 and the DCM control method adopted in the multi-level AC-DC conversion circuit 2 are the same. Therefore, the CCM and DCM control methods are described in detail as follows based on the multi-level AC-DC conversion circuit 2 only. Further, since one and the other one of the lower switch and upper switch are the main switch and the synchronous rectification switch respectively, the description for the control methods (including CCM and DCM control methods) of the present disclosure as follows focuses on the control for the main switch, and the lower switches Sa1, Sa2, . . . , Sa(N−1) are determined as the main switches (i.e., the main switches Sa1, Sa2, . . . , Sa(N−1)) as an example. For the case that the upper switches Sb1, Sb2, . . . , Sb(N−1) are determined as the main switches, the control for the main switches is applied to the upper switches Sb1, Sb2, . . . , Sb(N−1), and thus the detailed descriptions are omitted herein. In addition, it is noted that the control methods mentioned in the present disclosure are all performed by the control unit 10 or 20 shown in FIG. 1 or FIG. 2.

Figure 4:
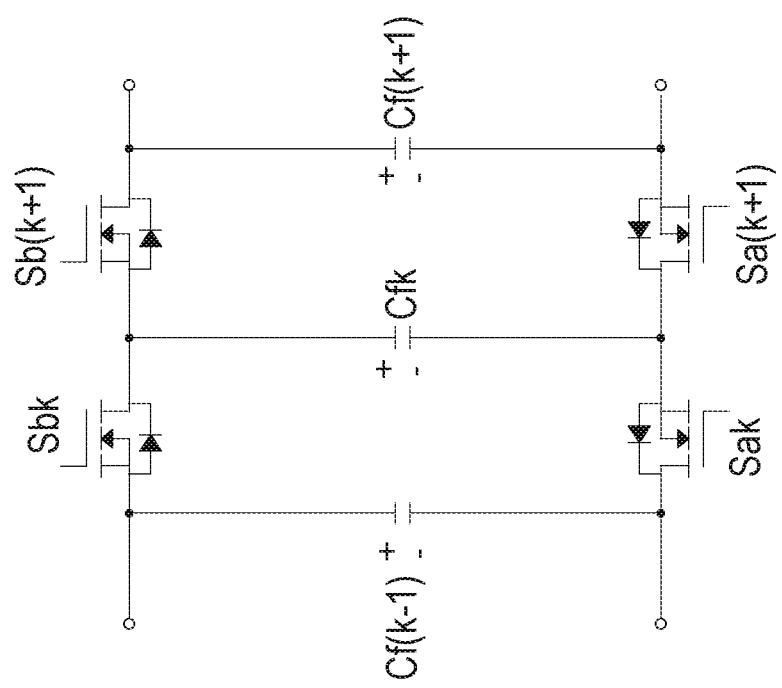
FIG. 4 schematically shows a part of the flying capacitors, main switches and synchronous rectification switches in the multi-level conversion circuit.
Figure 5A:
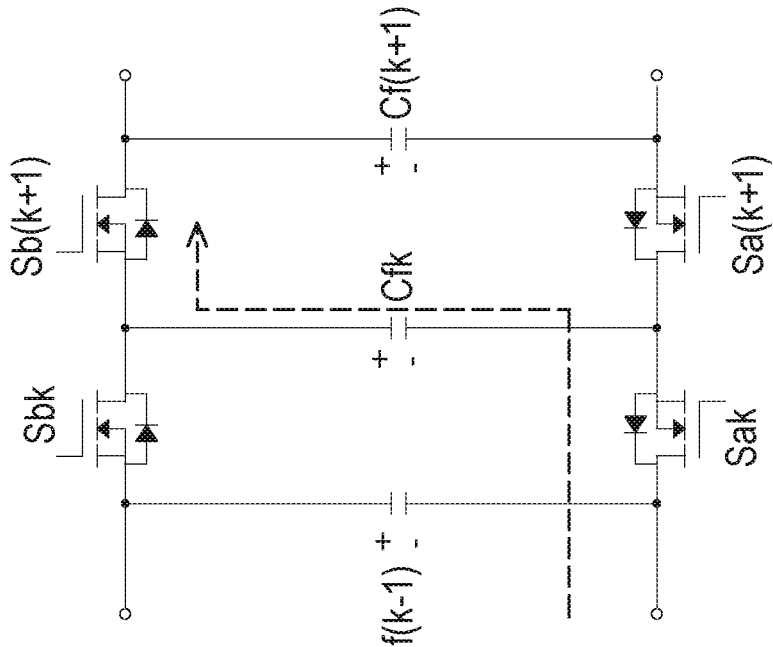
FIGS. 5A, 5B, 5C and 5D show the charging state, discharging state and bypass state of the flying capacitor in FIG. 4.
Figure 5B:
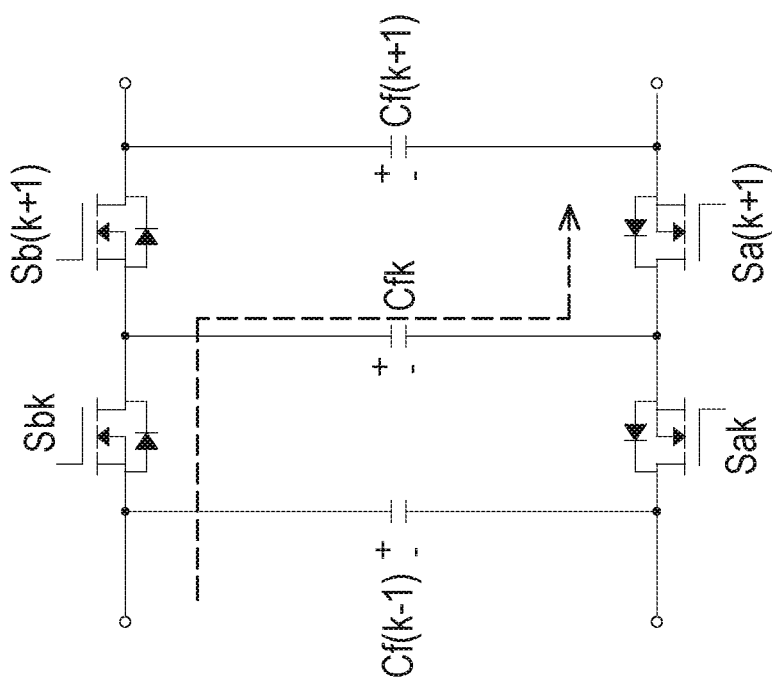
Figures 5C, 5D:
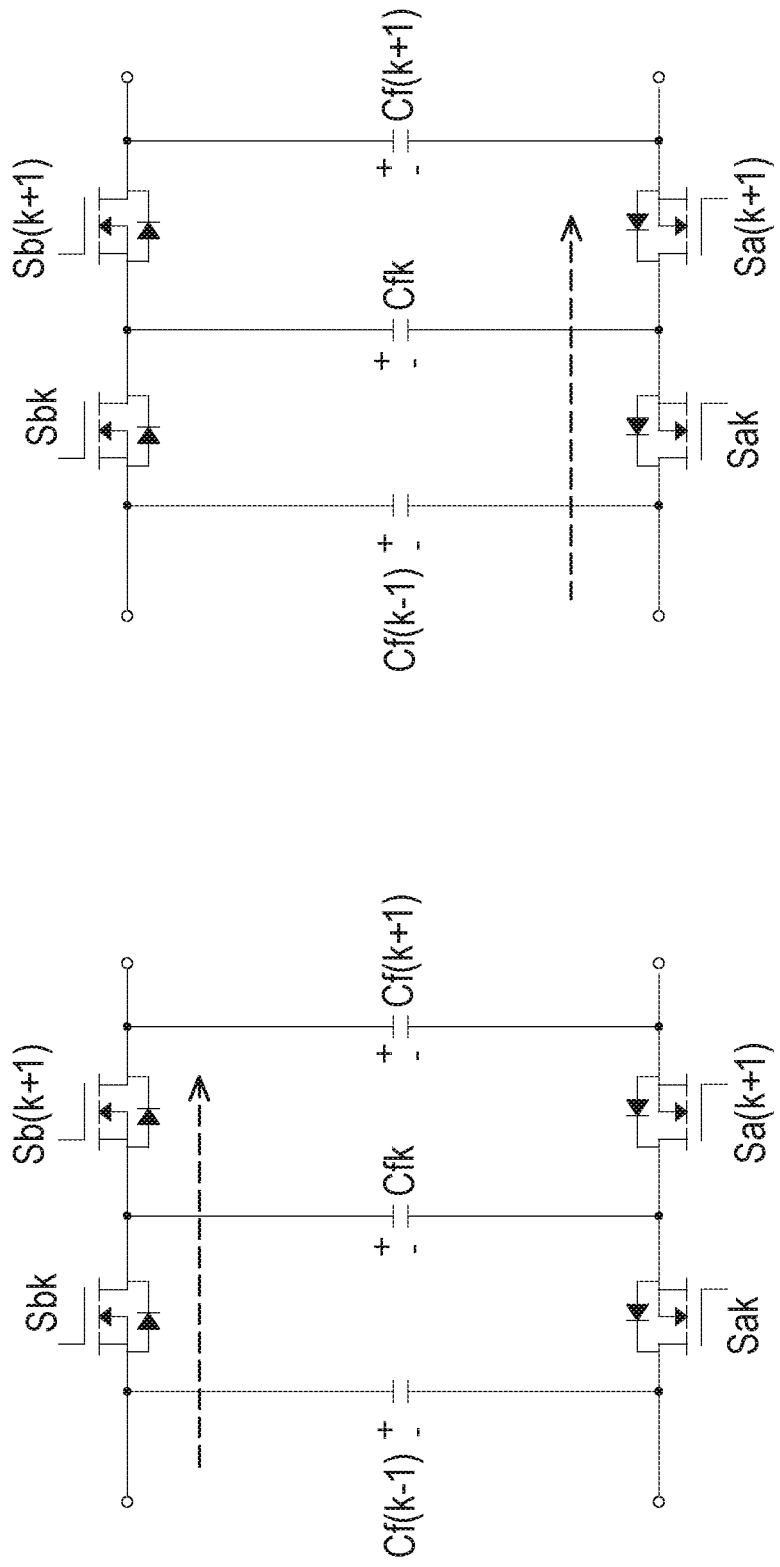

In the multi-level conversion circuit, whether the flying capacitor is charged or discharged depends on the switching state (on or off) of the neighboring switch, which would be described as follows according to FIG. 4, FIG. 5A, FIG. 5B, FIG. 5C and FIG. 5D. FIG. 4 shows a part of the flying capacitors, main switches and synchronous rectification switches in the multi-level conversion circuit, including the kth, (k−1)th and (k+1)th flying capacitors Cfk, Cf(k−1) and Cf(k+1), the kth and (k+1)th main switches Sak and Sa(k+1), and the kth and (k+1)th synchronous rectification switches Sbk and Sb(k+1). In the example shown in FIG. 4, 1<k<N−2. In addition, the flying capacitor Cf(k−1) is deleted when k=1, and the flying capacitor Cf(k+1) is replaced by the output capacitor Cp when k=N−2. FIGS. 5A, 5B, 5C and 5D show the charging state, discharging state and bypass state of the flying capacitor Cfk in FIG. 4, and the current path is depicted by dotted lines with arrow. As shown in FIG. 5A, when the main switches Sak and Sa(k+1) are turned off and turned on respectively, the synchronous rectification switches Sbk and Sb(k+1) are turned on and turned off respectively, and the flying capacitor Cfk is charged to be in the charging state. As shown in FIG. 5B, when the main switches Sak and Sa(k+1) are turned on and turned off respectively, the synchronous rectification switches Sbk and Sb(k+1) are turned off and turned on respectively, and the flying capacitor Cfk is discharged to be in the discharging state. As shown in FIG. 5C, when the main switches Sak and Sa(k+1) are both turned off, the synchronous rectification switches Sbk and Sb(k+1) are both turned on. At this time, since the current doesn't flow through the flying capacitor Cfk, the flying capacitor Cfk is in the bypass state and is neither charged nor discharged. As shown in FIG. 5D, when the main switches Sak and Sa(k+1) are both turned on, the synchronous rectification switches Sbk and Sb(k+1) are both turned off. At this time, since the current doesn't flow through the flying capacitor Cfk, the flying capacitor Cfk is in the bypass state and is neither charged nor discharged.

Figure 6:
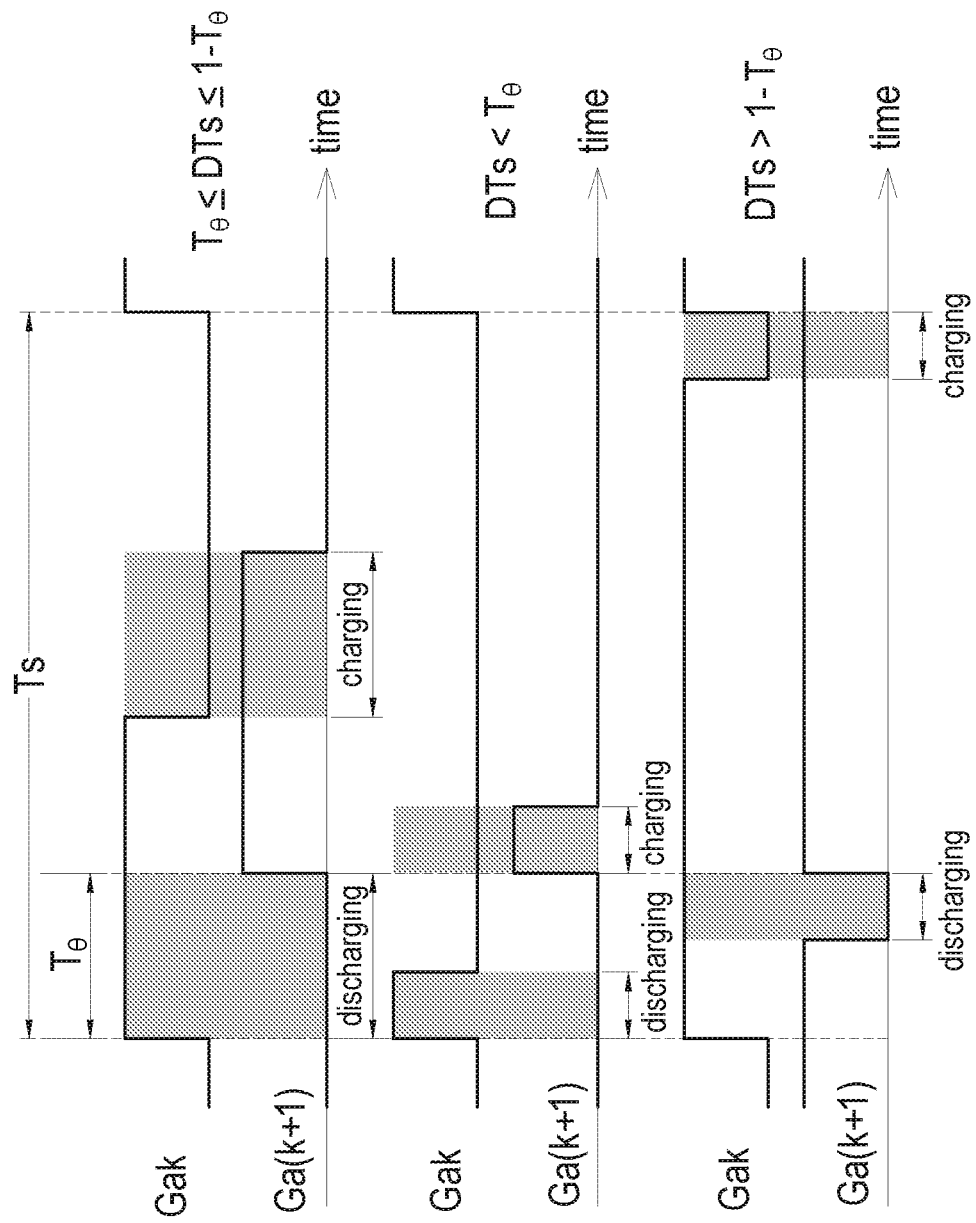
FIG. 6 schematically shows the relation between the charging and discharging time lengths of the flying capacitor and the switching state of the neighboring main switches.

FIG. 6 schematically shows the relation between the charging and discharging time lengths of the flying capacitor and the switching state of the neighboring main switches. In FIG. 6, Gak and Ga(k+1) represent the control signals of the main switches Sak and Sa(k+1) respectively, D is the duty ratio of switches, and the shadow part is the time period of charging or discharging the flying capacitor Cfk. In the multi-level conversion circuit, the initial duty ratio of each main switch is equal to the duty ratio D. As shown in FIG. 6, the waveforms of the control signals Gak and Ga(k+1) of the main switches Sak and Sa(k+1) under $T_\theta \leq DTs \leq 1-T_\theta$, under $DTs<T_\theta$, and under $DTs>1-T_\theta$ are sequentially shown from top to bottom. When $T_\theta \leq DTs \leq 1-T_\theta$, the charging time length and discharging time length of the flying capacitor Cfk are both equal to $T_\theta$. When $DTs<T_\theta$, the charging time length and discharging time length of the flying capacitor Cfk are both equal to DTs. When $DTs>1-T_\theta$, the charging time length and discharging time length of the flying capacitor Cfk are both equal to (1-D)Ts. It can be seen that the charging time length and discharging time length of the flying capacitor may be adjusted through adjusting the magnitude of the duty ratio of the main switch, thereby adjusting the voltage on the flying capacitor. In specific, the change of the duty ratio of any main switch would cause the voltage on the neighboring flying capacitor to change. Taking FIG. 6 as an example, the change of the duty ratio of the main switch Sak would cause the voltages across the neighboring flying capacitor Cf(k−1) and Cfk to change, and the change of the duty ratio of the main switch Sa(k+1) would cause the voltages across the neighboring flying capacitor Cfk and Cf(k+1) to change. On the other hand, the voltage across the flying capacitor Cfk would be affected by the change of the duty ratios of the neighboring main switches Sak and Sa(k+1).

Taking the flying capacitors Cf(k−1), Cfk and Cf(k+1) shown in FIG. 4 as an example, the adjustment value corresponding to each flying capacitor may be acquired according to the adopted control method (using proportional controller as an example) and the actual voltage and reference voltage of the flying capacitor. The specific calculation is exemplified as follows:

$$\Delta d_{k-1} = Kp(V^*_{Cf(k-1)} - V_{Cf(k-1)})$$

$$\Delta d_k = Kp(V^*_{Cf(k)} - V_{Cf(k)})$$

$$\Delta d_{k+1} = Kp(V^*_{Cf(k+1)} - V_{Cf(k+1)}) \qquad (1),$$

where $\Delta d_{k-1}$, $\Delta d_k$ and $\Delta d_{k+1}$ are the adjustment values corresponding to the flying capacitors Cf(k−1), Cfk and Cf(k+1) respectively, Kp is a proportional coefficient, $V^*_{Cf(k-1)}$, $V^*_{Cf(k)}$ and $V^*_{Cf(k+1)}$ are the reference voltages of the flying capacitors Cf(k−1), Cfk and Cf(k+1) respectively, and $V_{Cf(k-1)}$, $V_{Cf(k)}$ and $V_{Cf(k+1)}$ are the actual voltages across the flying capacitors Cf(k−1), Cfk and Cf(k+1) respectively.

Please refer to FIG. 2 and FIG. 4. The CCM control method and the DCM control method of the present disclosure are respectively described in detail as follows.

In the CCM control method, firstly, the adjustment values corresponding to all the flying capacitors Cf1, Cf2, ..., Cf(N−2) respectively are acquired according to the above equation (1). Then, the duty ratio of the kth main switch Sak is adjusted according to the adjustment value(s) corresponding to the flying capacitor(s) connected to the kth main switch Sak, and the duty ratio of the (N−1)th main switch Sa(N−1) is adjusted according to the adjustment value corresponding to the flying capacitor connected to the (N−1)th main switch Sa(N−1). The specific adjustment is exemplified as follows:

$$D'_k = D_k + (\Delta d_{k-1} - \Delta d_k)$$

$$D'_{k+1} = D_{k+1} + (\Delta d_k - \Delta d_{k+1}) \qquad (2),$$

where $D_k$ and $D'_k$ are the duty ratios of the kth main switch Sak before and after the adjustment respectively, and $D_{k+1}$ and $D'_{k+1}$ are the duty ratios of the (k+1)th main switch Sa(k+1) before and after the adjustment respectively, and $D_k = D_{k+1} = D$. In addition, $\Delta d_{k-1}$ is zero when k equals 1, and $\Delta d_{k+1}$ is zero when k equals N−2.

Meanwhile, the phase-shift angle θ between the kth main switch Sak and the (k+1)th main switch Sa(k+1) is increased by an angle φk so that the peak value or valley value of the current flowing through the inductor L remains unchanged before and after adjusting duty ratio. The specific calculation is exemplified as follows:
when $D \leq 1/(N-1)$, $$D_{\varphi k} = \frac{-1}{(N-1)D} \Delta d_k, \qquad (3)$$

and when $m/(N-1) < D \leq (m+1)/(N-1)$, $$D_{\varphi k} = -\Delta d_k[(N-1)(\frac{m+1}{N-1} - D)]^{(-1)^{m+1}}, \qquad (4)$$

where m is a positive integer less than or equal to N−2, and $D_{\varphi k}$ is the duty ratio corresponding to the angle φk.

In an embodiment, in the CCM control method, when $D \leq 1/(N-1)$, the valley value of the current flowing through the inductor L remains unchanged before and after adjusting the duty ratio through controlling the angle φk. When $m/(N-1) < D \leq (m+1)/(N-1)$ and m is an odd number, the peak value of the current flowing through the inductor L remains unchanged before and after adjusting the duty ratio through controlling the angle φk. When $m/(N-1) < D \leq (m+1)/(N-1)$ and m is an even number, the valley value of the current flowing through the inductor L remains unchanged before and after adjusting the duty ratio through controlling the angle φk.

It should be noted that when DTs is an integer multiple of $T_\theta$, the multi-level conversion circuit certainly works in CCM since the current flowing through the inductor L cannot be zero. Therefore, in the DCM control method, there is no need to consider the situation that DTs is an integer multiple of $T_\theta$.

In the DCM control method, firstly, the adjustment values corresponding to all the flying capacitors Cf1, Cf2, ..., Cf(N−2) respectively are acquired according to the above equation (1). Then, the duty ratio of the kth main switch Sak is adjusted according to the adjustment value(s) corresponding to the flying capacitor(s) connected to the kth main switch Sak, and the duty ratio of the (N−1)th main switch Sa(N−1) is adjusted according to the adjustment value corresponding to the flying capacitor connected to the (N−1)th main switch Sa(N−1). Regarding any main switch, the duty ratio is adjusted by a first adjustment amount when $D<(N-2)/(N-1)$, the duty ratio is adjusted by a second adjustment amount when $(N-2)/(N-1)<D \leq 1$, the product of the first adjustment amount and the second adjustment amount is negative, and the duty ratio before the adjustment is equal to the initial duty ratio D. In other words, regarding any main switch, the adjustment trend of the duty ratio under $D<(N-2)/(N-1)$ is opposite to that under $(N-2)/(N-1)<D \leq 1$, and the specific adjustment is exemplified as follows:
when $D<(N-2)/(N-1)$, $$D'_k = D_k + (\Delta d_{k-1} - \Delta d_k)$$

$$D'_{k+1} = D_{k+1} + (\Delta d_k - \Delta d_{k+1}) \qquad (5),$$

when (N−2)/(N−1)<D≤1, $$D'_k = D_k - (\Delta d_{k-1} - \Delta d_k)$$

$$D'_{k+1} = D_{k+1} - (\Delta d_k - \Delta d_{k+1}) \quad (6),$$

where $D_k$ and $D'_k$ are the duty ratios of the kth main switch Sak before and after the adjustment respectively, $D_{k+1}$ and $D'_{k+1}$ are the duty ratios of the (k+1)th main switch Sa(k+1) before and after the adjustment respectively, and $D_k = D_{k+1} = D$. $\Delta d_{k-1}$ is zero when k equals 1, and $\Delta d_{k+1}$ is zero when k equals N−2.

In an embodiment, in the DCM control method, in order to prevent adjusting the duty ratio from affecting the current in the next switching cycle and further affecting the charging and discharging of the flying capacitor and the steady-state operation of circuit, the absolute value of the adjustment value corresponding to each flying capacitor should be less than or equal to |D−$D_{ccm}$|, where $D_{ccm}$=1−(Vin/Vo). If the absolute value of the adjustment value $\Delta d_k$ corresponding to the kth flying capacitor Cfk is greater than |D−$D_{ccm}$|, the phase-shift angle θ between the kth main switch Sak and the (k+1)th main switch Sa(k+1) is adjusted to allow the current flowing through the inductor L to decrease to zero, thereby keeping the multi-level conversion circuit working in DCM.

Figure 7:
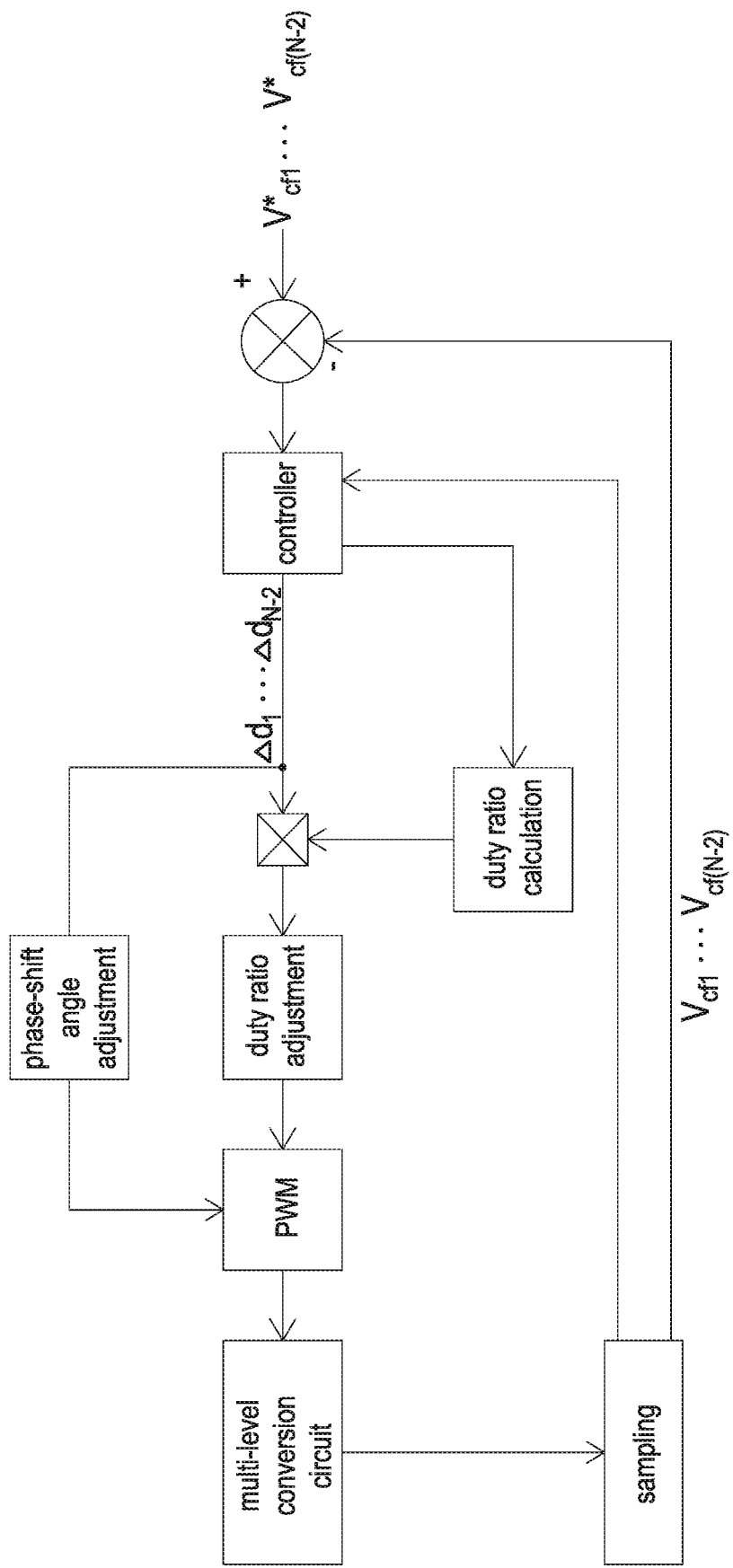
FIG. 7 is a schematic block diagram illustrating a control method for flying capacitor voltage of the present disclosure.

FIG. 7 is a schematic block diagram illustrating a control method for flying capacitor voltage of the present disclosure. As shown in FIG. 7 and the above-mentioned CCM and DCM control methods, in the present disclosure, the adjustment values corresponding to all the flying capacitors respectively are acquired firstly, and then the duty ratio of each switch and the phase-shift angle between switches are controlled based on the adjustment values so that the voltage on each flying capacitor is balanced. In FIG. 7, PWM (pulse width modulation) is utilized to generate the control signals of all the switches. In addition, the sampling results received by the controller may include the input voltage Vin, the output voltage Vo or the current flowing through the inductor L, but not limited thereto. The control method for flying capacitor voltage of the present disclosure can realize the balance of the flying capacitor voltage without determining the polarity of the current flowing through the inductor L. Therefore, the charging and discharging logic of the flying capacitor is prevented from being affected by misjudging the polarity of current, thereby improving the reliability of the balance control for flying capacitor voltage.

The control method for flying capacitor voltage of the present disclosure would be exemplified specifically according to the multi-level AC-DC conversion circuit 2 as follows.

Figure 8:
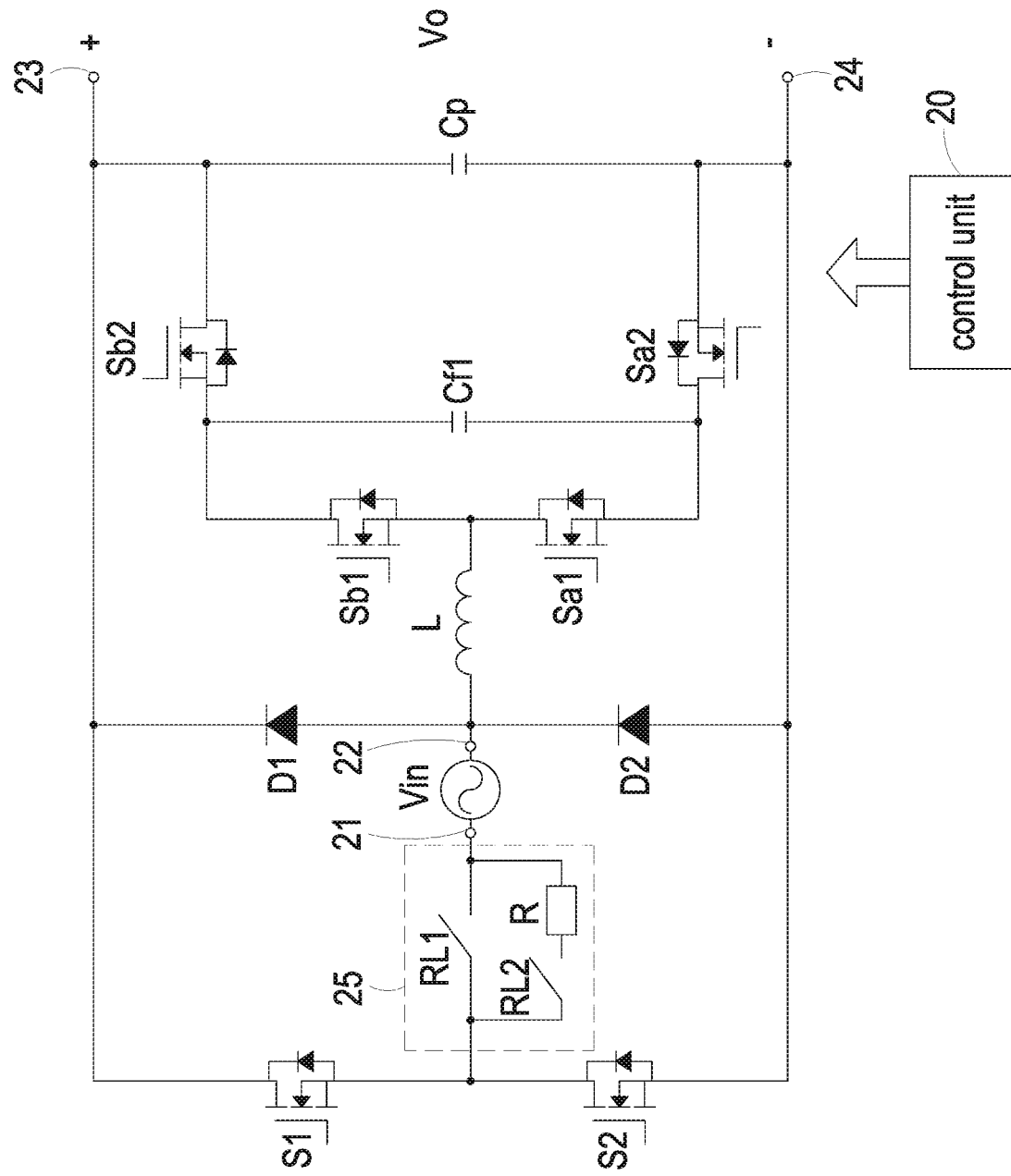
FIG. 8 is a circuit diagram showing the multi-level AC-DC conversion circuit of FIG. 2 with N=3.

As shown in FIG. 8, when N=3 (i.e., when the number of levels of the multi-level AC-DC conversion circuit 2 is three), the multi-level AC-DC conversion circuit 2 includes two lower switches Sa1 and Sa2, two upper switches Sb1 and Sb2 and one flying capacitor Cf1, and the time length $T_θ$ corresponding to the phase-shift angle θ is equal to 0.5 Ts. In this embodiment, the lower switch and the upper switch are determined as the main switch and the synchronous rectification switch respectively.

Under the circumstance that the multi-level AC-DC conversion circuit 2 of FIG. 8 works in CCM with D≤½, the following equation is acquired through the above equation (2):

$$D'_1 = D_1 - \Delta d_1$$

$$D'_2 = D_2 + \Delta d_1 \quad (7),$$

and the following equation is acquired through the above equation (3):

$$D_{\varphi 1} = \frac{-\Delta d_1}{2D}. \quad (8)$$

Figure 9A:
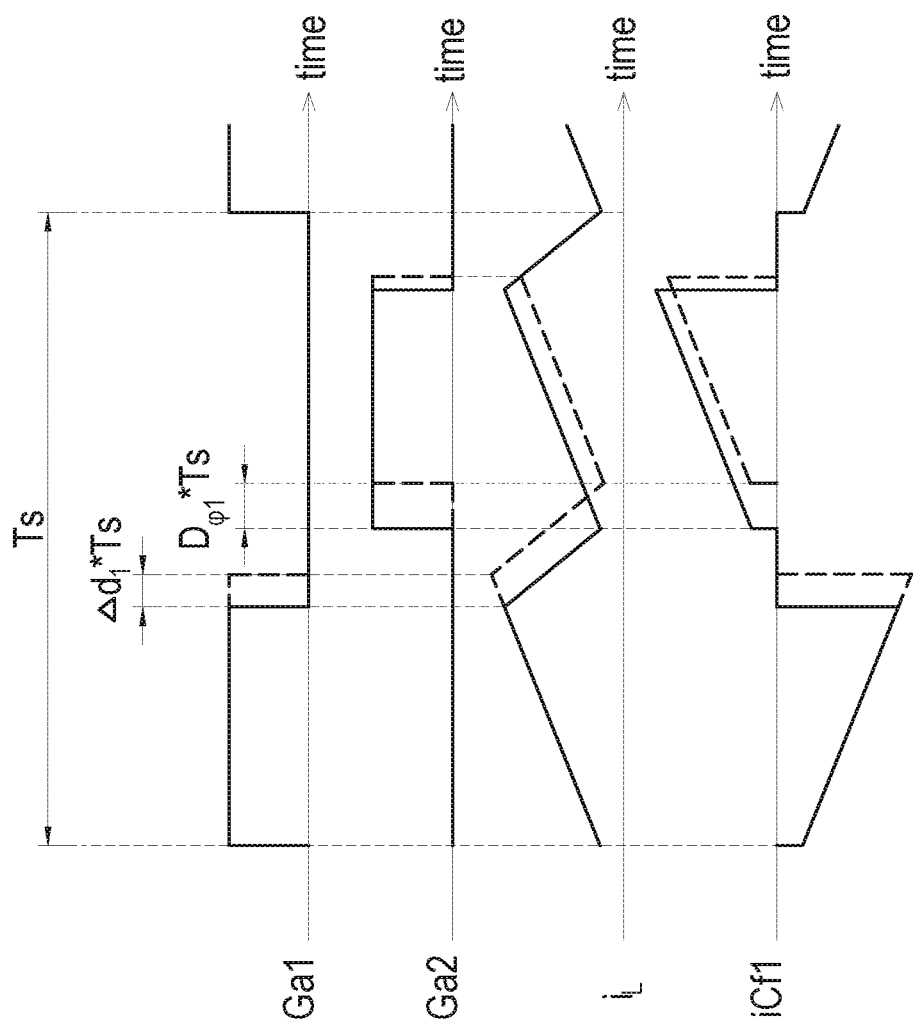
FIG. 9A schematically shows the waveforms of the multi-level AC-DC conversion circuit of FIG. 8 working in CCM with D≤½.

Assuming that the flying capacitor Cf1 needs to be discharged, $\Delta d_1 < 0$, and the corresponding waveforms in the multi-level AC-DC conversion circuit 2 is shown in FIG. 9A. In FIG. 9A, the waveforms before and after adjusting the duty ratio and the phase-shift angle θ are represented by solid lines and dashed lines respectively, Ga1 and Ga2 represent the control signals of the main switches Sa1 and Sa2 respectively, and iCf1 is the current flowing through the flying capacitor Cf1. Further, in FIG. 9A, $\Delta d_1$ and $D_{\varphi 1}$ indicate the portion of the switching waveforms affected by adjusting the duty ratio and the phase-shift angle respectively. As shown in FIG. 9A, through controlling the angle ϕ1, the valley value of the current $i_L$ flowing through the inductor L remains unchanged before and after adjusting the duty ratio so that the charging and discharging of the flying capacitor Cf1 are ensured to be independent from each other. Moreover, since the discharging time length is longer than the charging time length, the discharging of the flying capacitor Cf1 is realized.

Under the circumstance that the multi-level AC-DC conversion circuit 2 of FIG. 8 works in CCM with ½<D≤1, the following equation is acquired through the above equation (2):

$$D' = D_1 - \Delta d_1$$

$$D'_2 = D_2 + \Delta d_1 \quad (9),$$

and the following equation is acquired through the above equation (4):

$$D_{\phi 1} = -2(1-D)\Delta d_1 \quad (10).$$

Figure 9B:
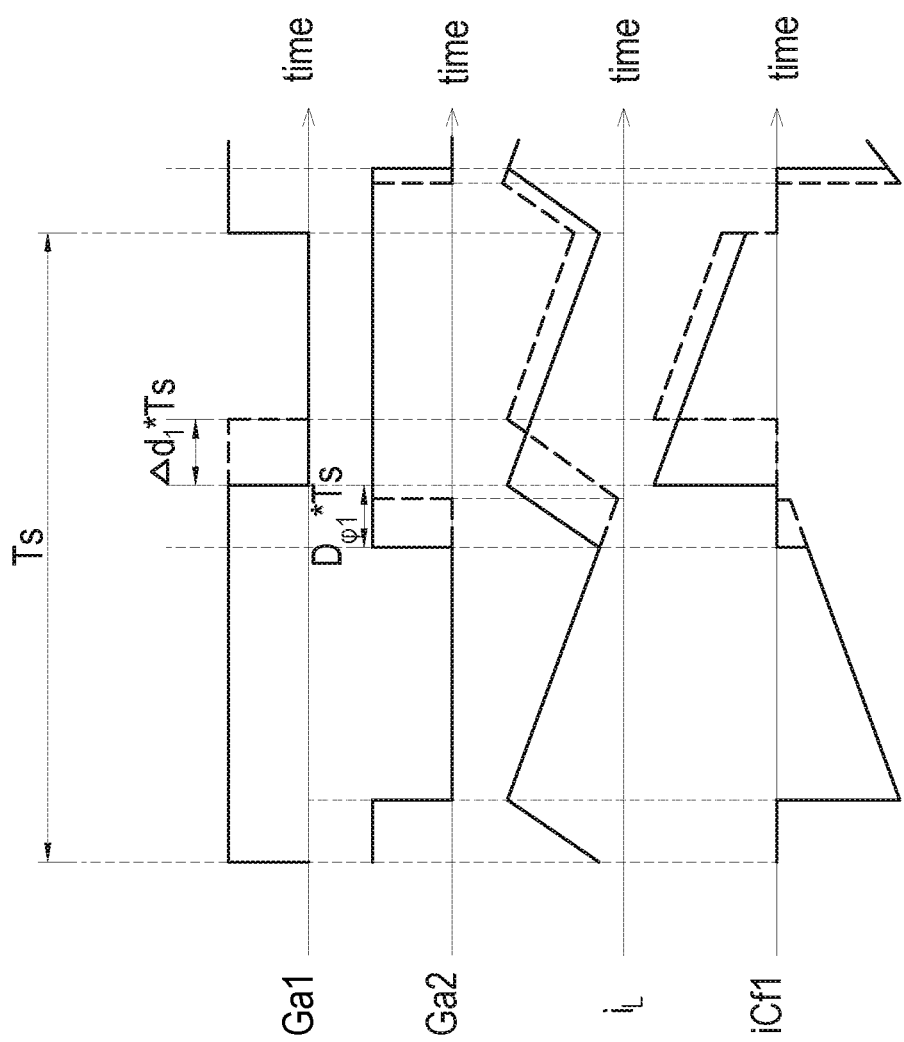
FIG. 9B schematically shows the waveforms of the multi-level AC-DC conversion circuit of FIG. 8 working in CCM with ½<D≤1.

Assuming that the flying capacitor Cf1 needs to be discharged, $\Delta d_1 < 0$, and the corresponding waveforms in the multi-level AC-DC conversion circuit 2 is shown in FIG. 9B. In FIG. 9B, the waveforms before and after adjusting the duty ratio and the phase-shift angle θ are represented by solid lines and dashed lines respectively. As shown in FIG. 9B, through controlling the angle ϕ1, the peak value of the current $i_L$ flowing through the inductor L remains unchanged before and after adjusting the duty ratio so that the charging and discharging of the flying capacitor Cf1 are ensured to be independent from each other. Moreover, since the discharging time length is longer than the charging time length, the discharging of the flying capacitor Cf1 is realized.

Under the circumstance that the multi-level AC-DC conversion circuit 2 of FIG. 8 works in DCM with D≤½, the following equation is acquired through the above equation (5):

$$D' = D_1 - \Delta d_1$$

$$D_2 = D_2 + \Delta d_1 \quad (11).$$

Figure 10A:
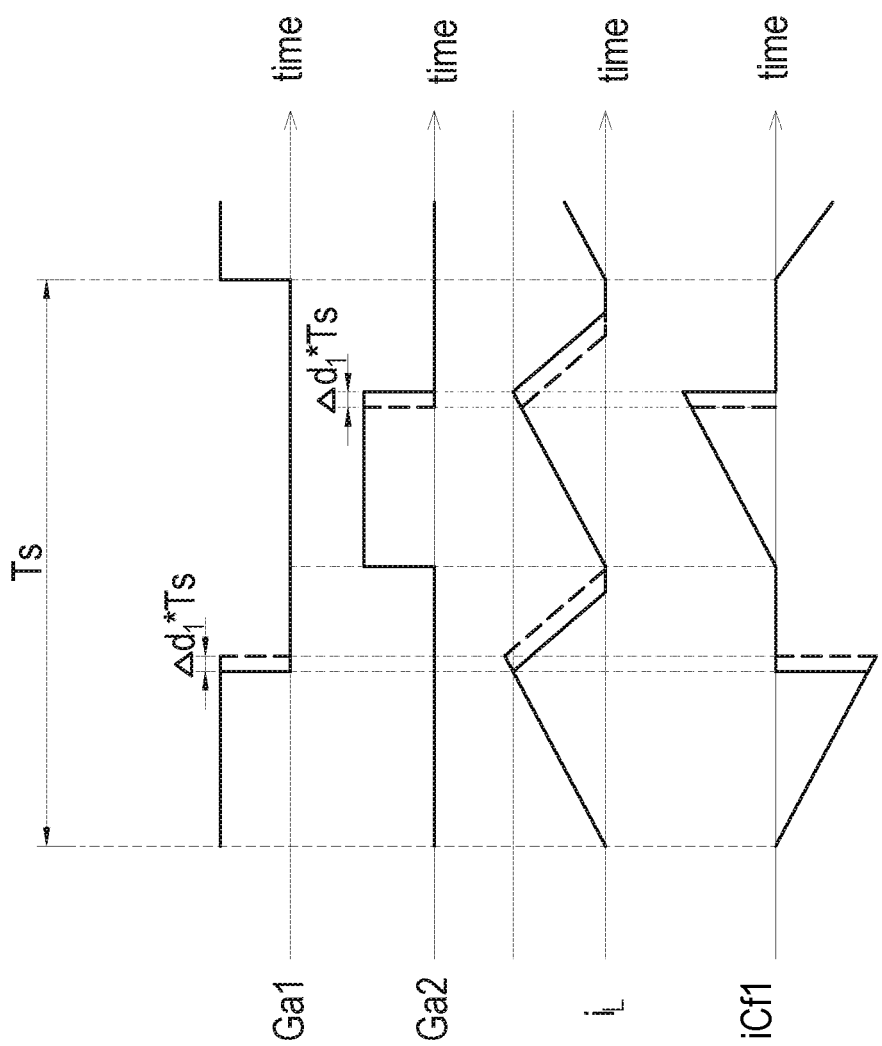
FIG. 10A schematically shows the waveforms of the multi-level AC-DC conversion circuit of FIG. 8 working in DCM with D≤½, and the absolute value of the adjustment value $\Delta d_1$ is less than or equal to $|D-D_{ccm}|$.

Assuming that the flying capacitor Cf1 needs to be discharged, $\Delta d_1 < 0$, and the corresponding waveforms in the multi-level AC-DC conversion circuit 2 is shown in FIG. 10A. In FIG. 10A, the waveforms before and after adjusting the duty ratio are represented by solid lines and dashed lines respectively. As shown in FIG. 10A, since the current $i_L$ flowing through the inductor L still can reach zero, the original DCM working state would not be broken. The charging and discharging of the flying capacitor Cf1 are independent from each other, and the discharging of the flying capacitor Cf1 is realized since the discharging time length is longer than the charging time length.

Under the circumstance that the multi-level AC-DC conversion circuit 2 of FIG. 8 works in DCM with ½<D≤1, the following equation is acquired through the above equation (6):

$$D'=D_1+\Delta d_1$$

$$D'_2=D_2-\Delta d_1 \quad (12).$$

Figure 10B:
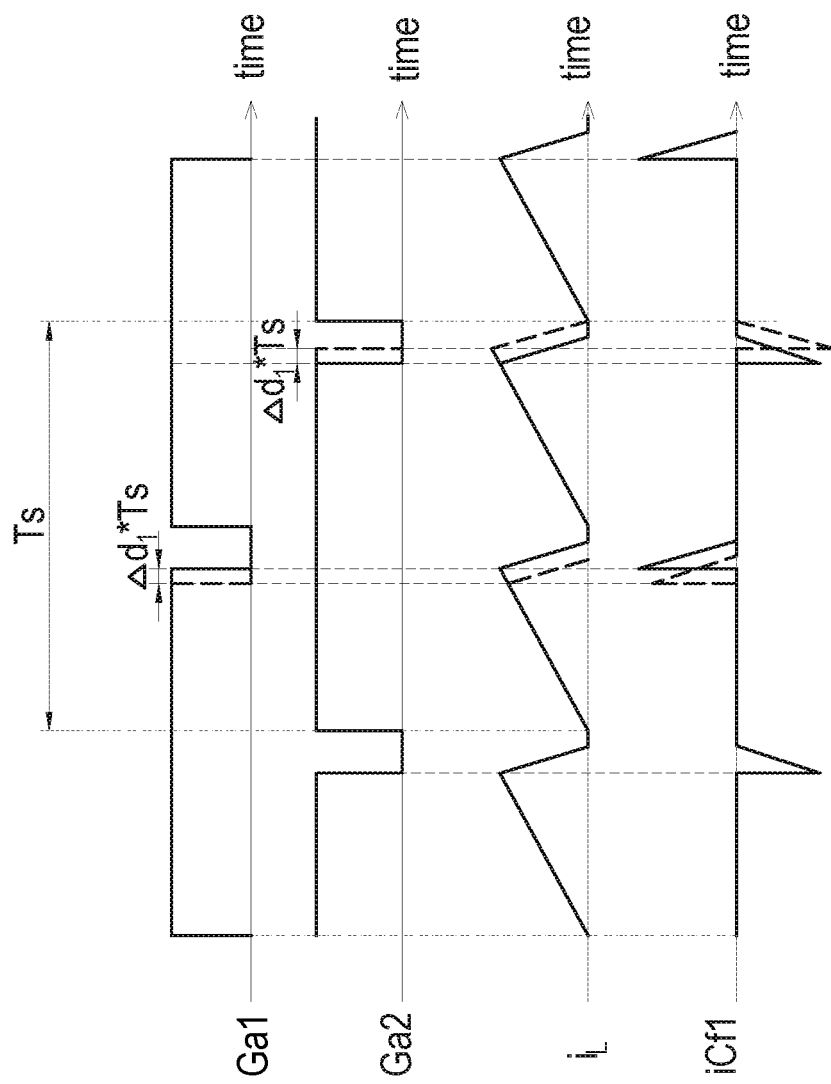
FIG. 10B schematically shows the waveforms of the multi-level AC-DC conversion circuit of FIG. 8 working in DCM with ½<D≤1, and the absolute value of the adjustment value $\Delta d_1$ is less than or equal to $|D-D_{ccm}|$.

Assuming that the flying capacitor Cf1 needs to be discharged, $\Delta d_1 < 0$, and the corresponding waveforms in the multi-level AC-DC conversion circuit 2 is shown in FIG. 10B. In FIG. 10B, the waveforms before and after adjusting the duty ratio are represented by solid lines and dashed lines respectively. As shown in FIG. 10B, since the current $i_L$ flowing through the inductor L still can reach zero, the original DCM working state would not be broken. The charging and discharging of the flying capacitor Cf1 are independent from each other, and the discharging of the flying capacitor Cf1 is realized since the discharging time length is longer than the charging time length.

Figure 11A:
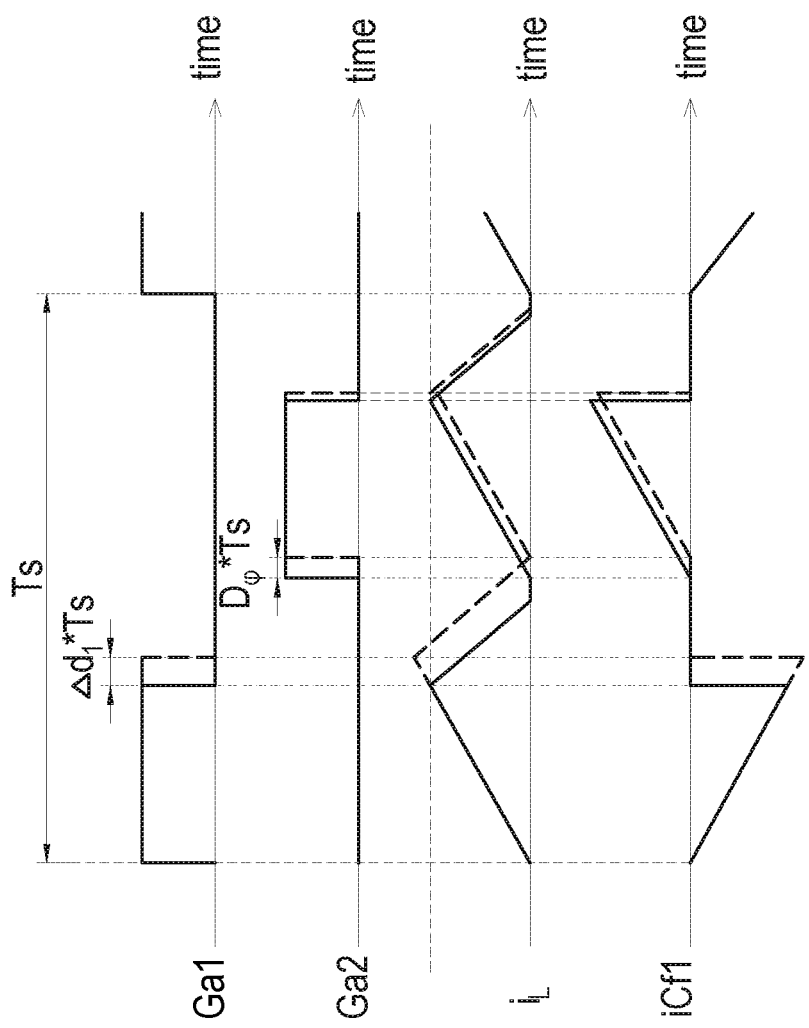
FIG. 11A schematically shows the waveforms of the multi-level AC-DC conversion circuit of FIG. 8 working in DCM with D≤½, and the absolute value of the adjustment value $\Delta d_1$ is greater than $|D-D_{ccm}|$.
Figure 11B:
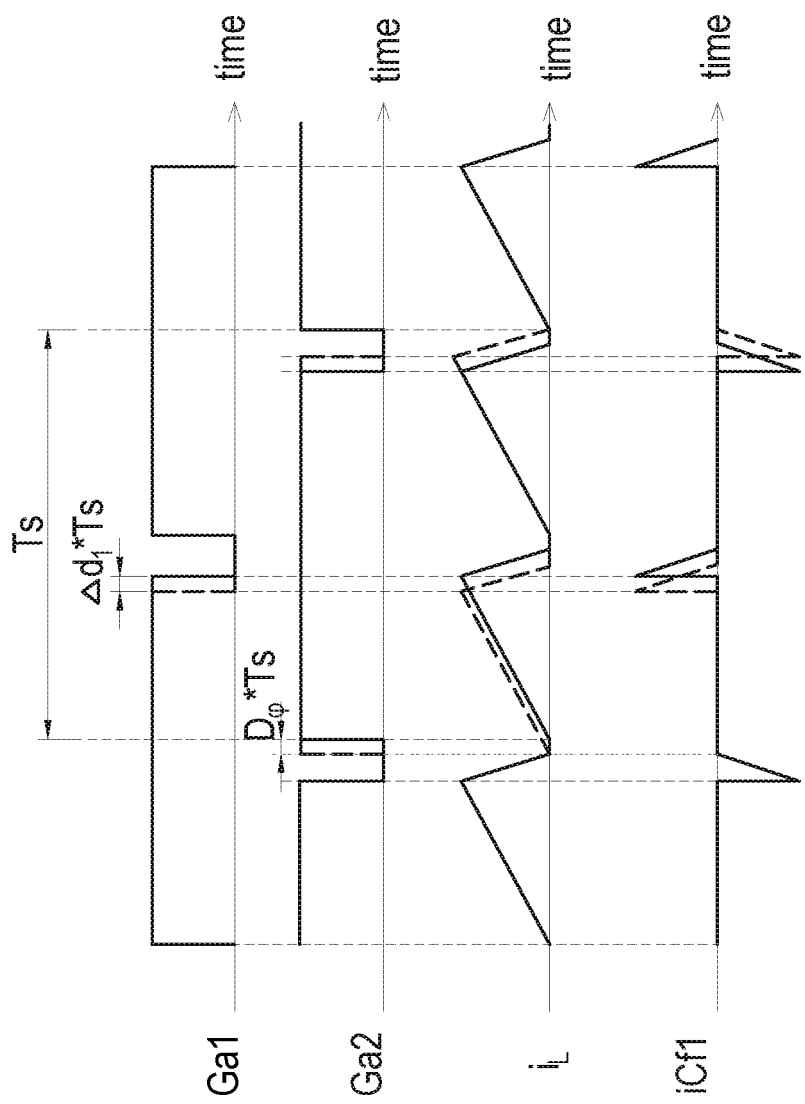
FIG. 11B schematically shows the waveforms of the multi-level AC-DC conversion circuit of FIG. 8 working in DCM with ½<D≤1, and the absolute value of the adjustment value $\Delta d_1$ is greater than $|D-D_{ccm}|$.

In the examples shown in FIG. 10A and FIG. 10B, the absolute value of the adjustment value $\Delta d_1$ corresponding to the flying capacitor Cf1 is less than or equal to $|D-D_{ccm}|$. In another embodiment, if the absolute value of the adjustment value $\Delta d_1$ is greater than $|D-D_{ccm}|$, the phase-shift angle θ between the main switches Sa1 and Sa2 needs to be adjusted for allowing the current flowing through the inductor L to decrease to zero. FIG. 11A schematically shows the waveforms of the multi-level AC-DC conversion circuit of FIG. 8 working in DCM with D≤½, and the absolute value of the adjustment value $\Delta d_1$ is greater than $|D-D_{ccm}|$. FIG. 11B schematically shows the waveforms of the multi-level AC-DC conversion circuit of FIG. 8 working in DCM with ½<D≤1, and the absolute value of the adjustment value $\Delta d_1$ is greater than $|D-D_{ccm}|$. In FIG. 11A and FIG. 11B, the waveforms before and after adjusting the duty ratio are represented by solid lines and dashed lines respectively.

Figure 12:
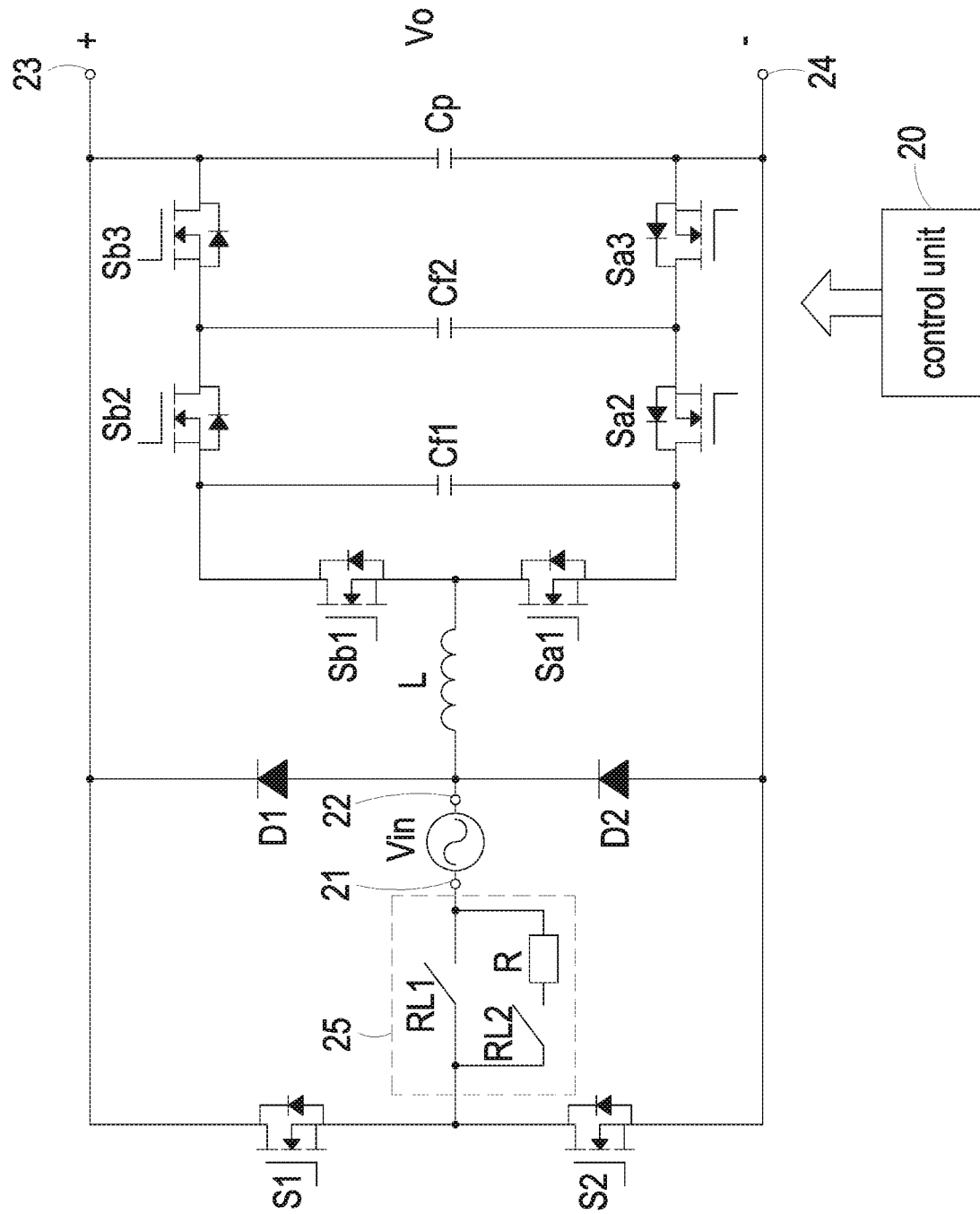
FIG. 12 is a circuit diagram showing the multi-level AC-DC conversion circuit of FIG. 2 with N=4.

As shown in FIG. 12, when N=4 (i.e., when the number of levels of the multi-level AC-DC conversion circuit 2 is four), the multi-level AC-DC conversion circuit 2 includes three lower switches Sa1, Sa2 and Sa3, three upper switches Sb1, Sb2 and Sb3 and two flying capacitor Cf1 and Cf2, and the time length TO corresponding to the phase-shift angle θ is equal to Ts/3. In this embodiment, the lower switch and the upper switch are determined as the main switch and the synchronous rectification switch respectively.

Under the circumstance that the multi-level AC-DC conversion circuit 2 of FIG. 12 works in CCM with D≤⅓, the following equation is acquired through the above equation (2):

$$D'=D_1-\Delta d_1$$

$$D'_2=D_2+\Delta d_1-\Delta d_2$$

$$D'_3=D_3+\Delta d_2 \quad (13),$$

and the following equation is acquired through the above $$D_{\varphi 1} = \frac{-\Delta d_1}{3D} \quad (14)$$

-continued
$$D_{\varphi 2} = \frac{-\Delta d_2}{3D}.$$

Assuming that the flying capacitor Cf1 needs to be discharged and the flying capacitor Cf2 doesn't need to be charged or discharged (i.e., maintaining voltage balance), $\Delta d_1 < 0$ and $\Delta d_2 = 0$, and the corresponding waveforms in the multi-level AC-DC conversion circuit 2 is shown in FIG. 13A. In FIG. 13A, the waveforms before and after adjusting the duty ratio and the phase-shift angle θ are represented by solid lines and dashed lines respectively. As shown in FIG. 13A, through controlling the angle ϕ1, the valley value of the current $i_L$ flowing through the inductor L remains unchanged before and after adjusting the duty ratio so that the charging and discharging of the flying capacitor Cf1 are ensured to be independent from each other. Moreover, since the discharging time length is longer than the charging time length, the discharging of the flying capacitor Cf1 is realized.

Under the circumstance that the multi-level AC-DC conversion circuit 2 of FIG. 12 works in CCM with ⅓<D≤⅔, the following equation is acquired through the above equation (2):

$$D'=D_1-\Delta d_1$$

$$D'_2=D_2+\Delta d_1-\Delta d_2$$

$$D'_3=D_3+\Delta d_2 \quad (15),$$

and the following equation is acquired through the above equation (4):

$$D_{\phi 1}=-3\Delta d_1(\tfrac{2}{3}-D)$$

$$D_{\phi 2}=-3\Delta d_2(\tfrac{2}{3}-D) \quad (16).$$

Figure 13B:
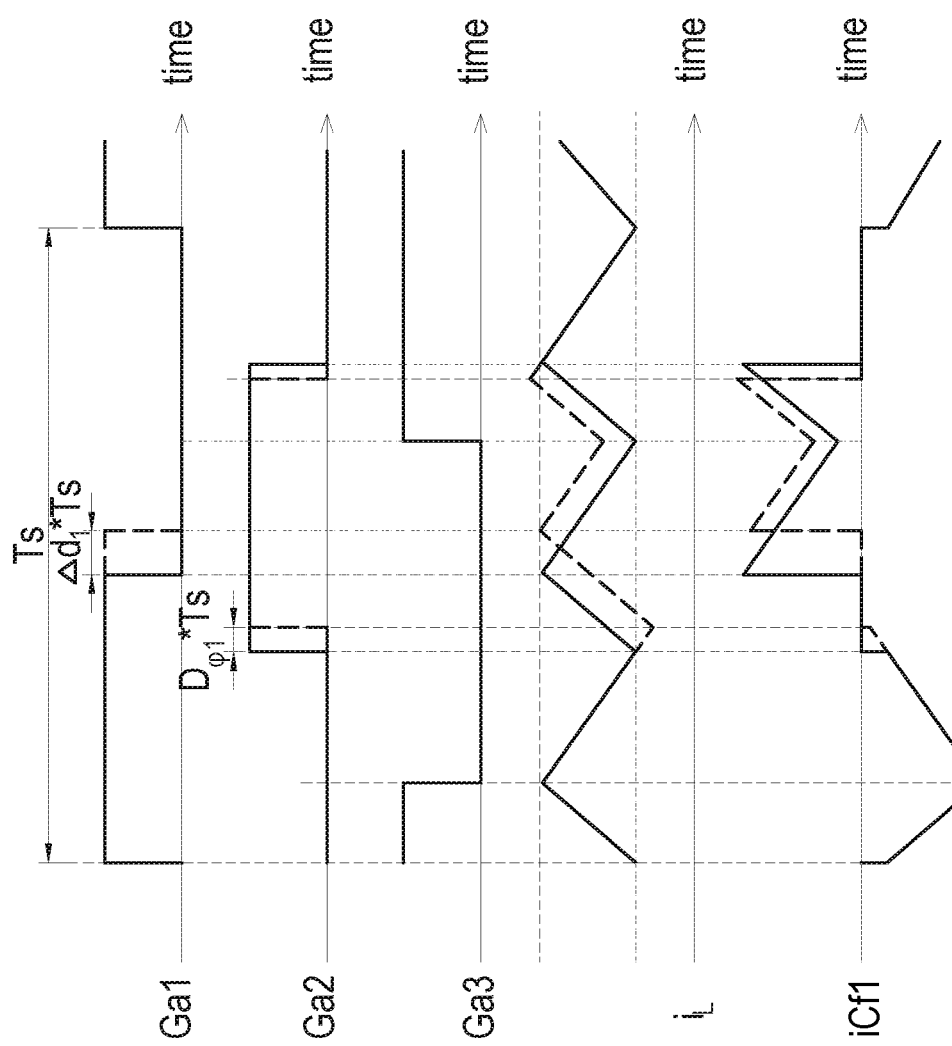
FIG. 13B schematically shows the waveforms of the multi-level AC-DC conversion circuit of FIG. 12 working in CCM with ⅓<D≤⅔.

Assuming that the flying capacitor Cf1 needs to be discharged and the flying capacitor Cf2 doesn't need to be charged or discharged, $\Delta d_1 < 0$ and $\Delta d_2 = 0$, and the corresponding waveforms in the multi-level AC-DC conversion circuit 2 is shown in FIG. 13B. In FIG. 13B, the waveforms before and after adjusting the duty ratio and the phase-shift angle θ are represented by solid lines and dashed lines respectively. As shown in FIG. 13B, through controlling the angle ϕ1, the peak value of the current $i_L$ flowing through the inductor L remains unchanged before and after adjusting the duty ratio so that the charging and discharging of the flying capacitor Cf1 are ensured to be independent from each other. Moreover, since the discharging time length is longer than the charging time length, the discharging of the flying capacitor Cf1 is realized.

Under the circumstance that the multi-level AC-DC conversion circuit 2 of FIG. 12 works in CCM with ⅔<D≤1, the following equation is acquired through the above equation (2):

$$D'_1=D_1-\Delta d_1$$

$$D'_2=D_2+\Delta d_1-\Delta d_2$$

$$D'_3=D_3+\Delta d_2 \quad (17),$$

and the following equation is acquired through the above $$D_{\varphi 1} = \frac{-\Delta d_1}{3(1-D)} \quad (18)$$

-continued $$D_{\varphi 2} = \frac{-\Delta d_2}{3(1-D)}.$$

Figure 13C:
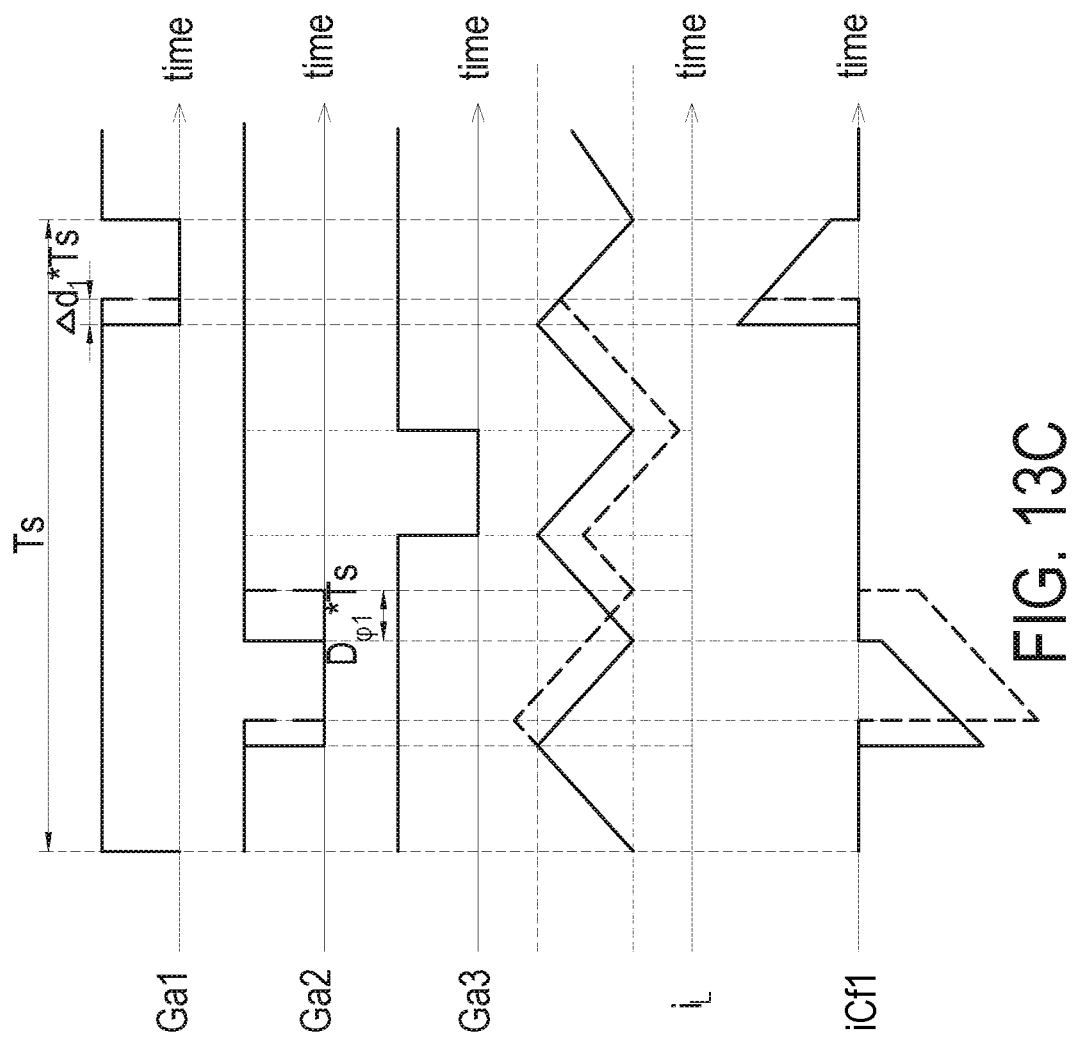
FIG. 13C schematically shows the waveforms of the multi-level AC-DC conversion circuit of FIG. 12 working in CCM with ⅔<D≤1.

Assuming that the flying capacitor Cf1 needs to be discharged and the flying capacitor Cf2 doesn't need to be charged or discharged, $\Delta d_1 < 0$ and $\Delta d_2 = 0$, and the corresponding waveforms in the multi-level AC-DC conversion circuit 2 is shown in FIG. 13C. In FIG. 13C, the waveforms before and after adjusting the duty ratio and the phase-shift angle θ are represented by solid lines and dashed lines respectively. As shown in FIG. 13C, through controlling the angle φ1, the valley value of the current $i_L$ flowing through the inductor L remains unchanged before and after adjusting the duty ratio so that the charging and discharging of the flying capacitor Cf1 are ensured to be independent from each other. Moreover, since the discharging time length is longer than the charging time length, the discharging of the flying capacitor Cf1 is realized.

Under the circumstance that the multi-level AC-DC conversion circuit 2 of FIG. 12 works in DCM with D<⅔, the following equation is acquired through the above equation (5):

$$D'_1 = D_1 - \Delta d_1$$

$$D'_2 = D_2 + \Delta d_1 - \Delta d_2$$

$$D'_3 = D_3 + \Delta d_2 \quad (19).$$

Figure 14A:
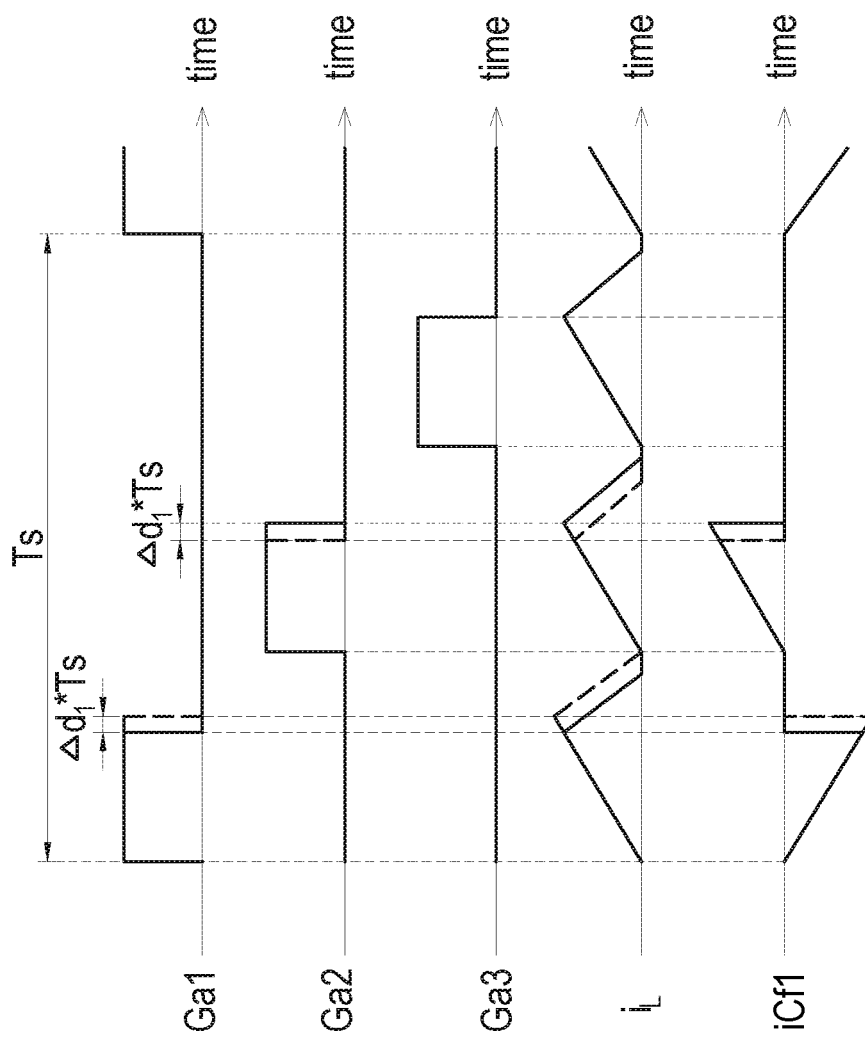
FIG. 14A schematically shows the waveforms of the multi-level AC-DC conversion circuit of FIG. 12 working in DCM with D≤⅓, and the absolute value of the adjustment value $\Delta d_1$ is less than or equal to $|D-D_{ccm}|$.
Figure 14B:
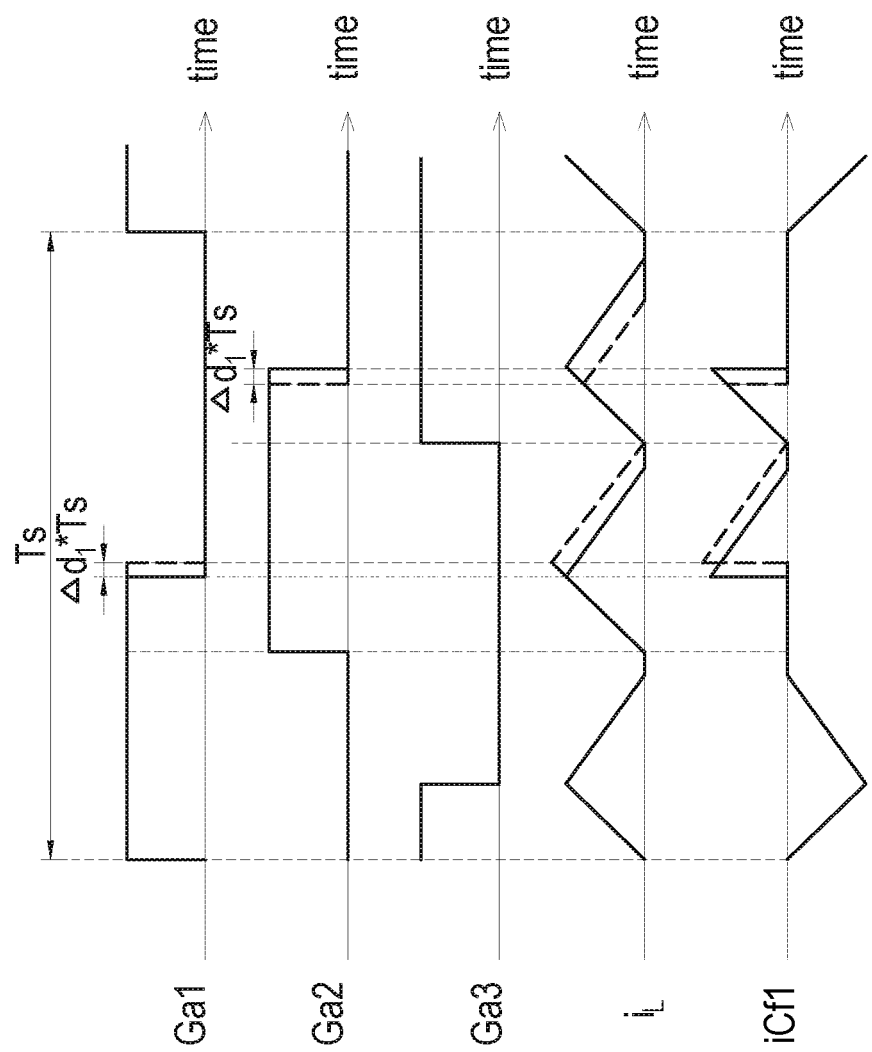
FIG. 14B schematically shows the waveforms of the multi-level AC-DC conversion circuit of FIG. 12 working in DCM with ⅓<D≤⅔, and the absolute value of the adjustment value $\Delta d_1$ is less than or equal to $|D-D_{ccm}|$.

Assuming that the flying capacitor Cf1 needs to be discharged and the flying capacitor Cf2 doesn't need to be charged or discharged, $\Delta d_1 < 0$ and $\Delta d_2 = 0$, and the corresponding waveforms in the multi-level AC-DC conversion circuit 2 under D≤⅓ and under ⅓<D≤⅔ are shown in FIG. 14A and FIG. 14B respectively. In FIG. 14A and FIG. 14B, the waveforms before and after adjusting the duty ratio are represented by solid lines and dashed lines respectively. As shown in FIG. 14A and FIG. 14B, since the current $i_L$ flowing through the inductor L still can reach zero, the original DCM working state would not be broken. The charging and discharging of the flying capacitor Cf1 are independent from each other, and the discharging of the flying capacitor Cf1 is realized since the discharging time length is longer than the charging time length.

Under the circumstance that the multi-level AC-DC conversion circuit 2 of FIG. 12 works in DCM with ⅔<D≤1, the following equation is acquired through the above equation (6):

$$D'_1 = D_1 + \Delta d_1$$

$$D'_2 = D_2 - \Delta d_1 + \Delta d_2$$

$$D'_3 = D_3 - \Delta d_2 \quad (20).$$

Figure 14C:
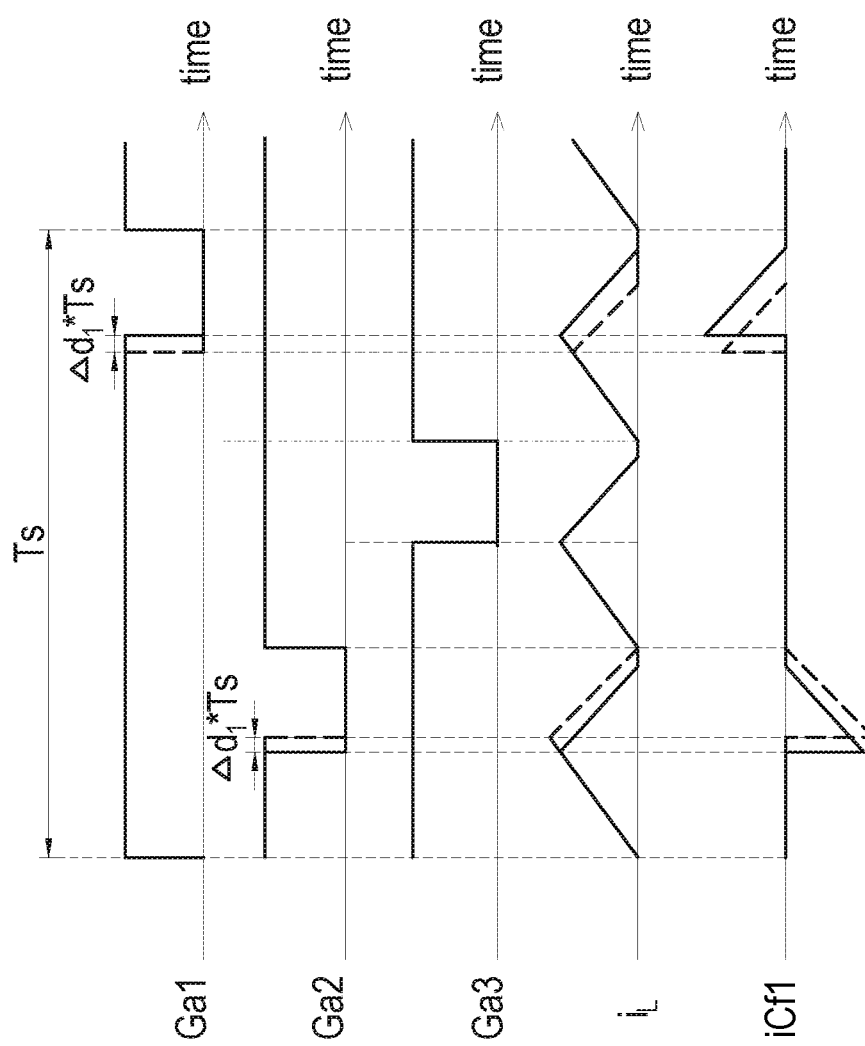
FIG. 14C schematically shows the waveforms of the multi-level AC-DC conversion circuit of FIG. 12 working in DCM with ⅔<D≤1, and the absolute value of the adjustment value $\Delta d_1$ is less than or equal to $|D-D_{ccm}|$.

Assuming that the flying capacitor Cf1 needs to be discharged and the flying capacitor Cf2 doesn't need to be charged or discharged, $\Delta d_1 < 0$ and $\Delta d_2 = 0$, and the corresponding waveforms in the multi-level AC-DC conversion circuit 2 are shown in FIG. 14C. In FIG. 14C, the waveforms before and after adjusting the duty ratio are represented by solid lines and dashed lines respectively. As shown in FIG. 14C, since the current $i_L$ flowing through the inductor L still can reach zero, the original DCM working state would not be broken. The charging and discharging of the flying capacitor Cf1 are independent from each other, and the discharging of the flying capacitor Cf1 is realized since the discharging time length is longer than the charging time length.

In summary, the present disclosure provides a multi-level conversion circuit and a control method for flying capacitor voltage thereof. The multi-level conversion circuit and the control method may be applied in CCM and DCM to balance the flying capacitor voltage through controlling the duty ratio of switch and the phase-shift angle between switches without determining the polarity of current. Consequently, the charging and discharging logic of the flying capacitor is prevented from being affected by misjudging the polarity of current, thereby improving the reliability of the balance control for flying capacitor voltage.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for flying capacitor voltage, applied in a multi-level DC-DC conversion circuit, wherein the number of levels of the multi-level DC-DC conversion circuit is N which is an integer greater than or equal to three, the multi-level DC-DC conversion circuit comprises a positive input terminal, a negative input terminal, an inductor, N−1 lower switches, N−1 upper switches, N−2 flying capacitors, a positive output terminal and a negative output terminal, the positive input terminal and the negative input terminal are configured to receive an input voltage, the positive output terminal and the negative output terminal are configured to provide an output voltage, a first terminal of the inductor is electrically connected to the positive input terminal, the N−1 lower switches are connected in series between a second terminal of the inductor and the negative output terminal, the first lower switch and the (N−1)th lower switch are coupled to the second terminal of the inductor and the negative output terminal respectively, the N−1 upper switches are connected in series between the second terminal of the inductor and the positive output terminal, the first upper switch and the (N−1)th upper switch are coupled to the second terminal of the inductor and the positive output terminal respectively, the kth flying capacitor is connected between a common connection node of the kth lower switch and the (k+1)th lower switch and a common connection node of the kth upper switch and the (k+1)th upper switch, k is a positive integer less than or equal to N−2, the negative output terminal is electrically connected to the negative input terminal, and when the multi-level DC-DC conversion circuit works in a DCM (discontinuous conduction mode), the control method comprises steps of:

(a) determining the N−1 lower switches as N−1 main switches, and determining the N−1 upper switches as N−1 synchronous rectification switches;

(b) acquiring an adjustment value corresponding to each of the N−2 flying capacitors according to an actual voltage and a reference voltage of the flying capacitor; and (c) adjusting a duty ratio of the kth main switch according to the adjustment value corresponding to the flying capacitor connected to the kth main switch, and adjusting a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

2. The control method according to claim 1, wherein in the step (c), when D<(N−2)/(N−1), $$D'_k = D_k + (\Delta d_{k-1} - \Delta d_k)$$

$$D'_{k+1} = D_{k+1} + (\Delta d_k - \Delta d_{k+1}),$$

when (N−2)/(N−1)<D≤1, $$D'_k = D_k - (\Delta d_{k-1} - \Delta d_k)$$

$$D'_{k+1} = D_{k+1} - (\Delta d_k - \Delta d_{k+1}),$$

where $D_k$ and $D'_k$ are the duty ratios of the kth main switch before and after the adjustment respectively, $D_{k+1}$ and $D'_{k+1}$ are the duty ratios of the (k+1)th main switch before and after the adjustment respectively, $D_k = D_{k+1} = D$, and $\Delta d_{k-1}$, $\Delta d_k$ and $\Delta d_{k+1}$ are the adjustment values corresponding to the (k−1)th, kth and (k+1)th flying capacitors respectively, wherein $\Delta d_{k-1}$ is zero when k equals 1, and $\Delta d_{k+1}$ is zero when k equals N−2.

3. The control method according to claim 1, wherein an absolute value of the adjustment value corresponding to each of the N−2 flying capacitors is less than or equal to $|D-D_{ccm}|$, where $D_{ccm}=1-(Vin/Vo)$, Vin is the input voltage, and Vo is the output voltage.

4. The control method according to claim 3, wherein if the absolute value of the adjustment value corresponding to the kth flying capacitor is greater than $|D-D_{ccm}|$, the control method further comprises: (d) adjusting a phase-shift angle between the kth main switch and the (k+1)th main switch to decrease a current flowing through the inductor to zero.

5. A multi-level DC-DC conversion circuit, wherein the number of levels of the multi-level DC-DC conversion circuit is N which is an integer greater than or equal to three, and the multi-level DC-DC conversion circuit comprises:

a positive input terminal and a negative input terminal, configured to receive an input voltage;

a positive output terminal and a negative output terminal, configured to provide an output voltage, wherein the negative output terminal is electrically connected to the negative input terminal;

an inductor, having a first terminal electrically connected to the positive input terminal;

N−1 lower switches, connected in series between a second terminal of the inductor and the negative output terminal, wherein the first lower switch and the (N−1)th lower switch are coupled to the second terminal of the inductor and the negative output terminal respectively;

N−1 upper switches, connected in series between the second terminal of the inductor and the positive output terminal, wherein the first upper switch and the (N−1)th upper switch are coupled to the second terminal of the inductor and the positive output terminal respectively;

N−2 flying capacitors, wherein the kth flying capacitor is connected between a common connection node of the kth lower switch and the (k+1)th lower switch and a common connection node of the kth upper switch and the (k+1)th upper switch, and k is a positive integer less than or equal to N−2; and a control unit, wherein when the multi-level DC-DC conversion circuit works in a DCM, the control unit is configured to:

determine the N−1 lower switches as N−1 main switches, and determine the N−1 upper switches as N−1 synchronous rectification switches;

acquire an adjustment value corresponding to each of the N−2 flying capacitors according to an actual voltage and a reference voltage of the flying capacitor; and adjust a duty ratio of the kth main switch according to the adjustment value corresponding to the flying capacitor connected to the kth main switch, and adjust a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

6. The multi-level DC-DC conversion circuit according to claim 5, wherein as the control unit adjusts the duty ratio of the main switch, when D<(N−2)/(N−1), $$D'_k = D_k + (\Delta d_{k-1} - \Delta d_k)$$

$$D'_{k+1} = D_{k+1} + (\Delta d_k - \Delta d_{k+1}),$$

when (N−2)/(N−1)<D≤1, $$D'_k = D_k - (\Delta d_{k-1} - \Delta d_k)$$

$$D'_{k+1} = D_{k+1} - (\Delta d_k - \Delta d_{k+1}),$$

where $D_k$ and $D'_k$ are the duty ratios of the kth main switch before and after the adjustment respectively, $D_{k+1}$ and $D'_{k+1}$ are the duty ratios of the (k+1)th main switch before and after the adjustment respectively, $D_k = D_{k+1} = D$, and $\Delta d_{k-1}$, $\Delta d_k$ and $\Delta d_{k+1}$ are the adjustment values corresponding to the (k−1)th, kth and (k+1)th flying capacitors respectively, wherein $\Delta d_{k-1}$ is zero when k equals 1, and $\Delta d_{k+1}$ is zero when k equals N−2.

7. The multi-level DC-DC conversion circuit according to claim 5, wherein an absolute value of the adjustment value corresponding to each of the N−2 flying capacitors is less than or equal to $|D-D_{ccm}|$, where $D_{ccm}=1-(Vin/Vo)$, Vin is the input voltage, and Vo is the output voltage.

8. The multi-level DC-DC conversion circuit according to claim 7, wherein if the absolute value of the adjustment value corresponding to the kth flying capacitor is greater than $|D-D_{ccm}|$, the control unit is further configured to adjust a phase-shift angle between the kth main switch and the (k+1)th main switch to decrease a current flowing through the inductor to zero.

9. A control method for flying capacitor voltage, applied in a multi-level AC-DC conversion circuit, wherein the number of levels of the multi-level AC-DC conversion circuit is N which is an integer greater than or equal to three, the multi-level AC-DC conversion circuit comprises a first input terminal, a second input terminal, an inductor, N−1 lower switches, N−1 upper switches, N−2 flying capacitors, a first output terminal, a second output terminal, a first input switch and a second input switch, the first input terminal and the second input terminal are configured to receive an input voltage, the first output terminal and the second output terminal are configured to provide an output voltage, a first terminal of the inductor is electrically connected to the second input terminal, the N−1 lower switches are connected in series between a second terminal of the inductor and the second output terminal, the first lower switch and the (N−1)th lower switch are coupled to the second terminal of the inductor and the second output terminal respectively, the N−1 upper switches are connected in series between the second terminal of the inductor and the first output terminal, the first upper switch and the (N−1)th upper switch are coupled to the second terminal of the inductor and the first output terminal respectively, the kth flying capacitor is connected between a common connection node of the kth lower switch and the (k+i)th lower switch and a common connection node of the kth upper switch and the (k+i)th upper switch, k is a positive integer less than or equal to N−2, the first input switch is coupled between the first input terminal and the first output terminal, the second input switch is coupled between the first input terminal and the second output terminal, a control signal of the first input switch is complementary to a control signal of the second input switch, and when the multi-level AC-DC conversion circuit works in a DCM, the control method comprises steps of:

(a) determining the N−1 lower switches and the N−1 upper switches as N−1 main switches and N−1 synchronous rectification switches respectively when a potential at the first input terminal being lower than a potential at the second input terminal, and determining the N−1 upper switches and the N−1 lower switches as N−1 main switches and N−1 synchronous rectification switches respectively when the potential at the first input terminal being higher than the potential at the second input terminal;

(b) acquiring an adjustment value corresponding to each of the N−2 flying capacitors according to an actual voltage and a reference voltage of the flying capacitor; and (c) adjusting a duty ratio of the kth main switch according to the adjustment value corresponding to the flying capacitor connected to the kth main switch, and adjusting a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

10. The control method according to claim 9, wherein in the step (c), when D<(N−2)/(N−1), $$D'_k = D_k + (\Delta d_{k-1} - \Delta d_k)$$

$$D'_{k+1} = D_{k+1} + (\Delta d_k - \Delta d_{k+1}),$$

when (N−2)/(N−1)<D≤1, $$D'_k = D_k - (\Delta d_{k-1} - \Delta d_k)$$

$$D'_{k+1} = D_{k+1} - (\Delta d_k - \Delta d_{k+1}),$$

where $D_k$ and $D'_k$ are the duty ratios of the kth main switch before and after the adjustment respectively, $D_{k+1}$ and $D'_{k+1}$ are the duty ratios of the (k+1)th main switch before and after the adjustment respectively, $D_k = D_{k+1} = D$, and $\Delta d_{k-1}$, $\Delta d_k$ and $\Delta d_{k+1}$ are the adjustment values corresponding to the (k−1)th, kth and (k+1)th flying capacitors respectively, wherein $\Delta d_{k-1}$ is zero when k equals 1, and $\Delta d_{k+1}$ is zero when k equals N−2.

11. The control method according to claim 9, wherein an absolute value of the adjustment value corresponding to each of the N−2 flying capacitors is less than or equal to |D−$D_{ccm}$|, where $D_{ccm}$=1−(Vin/Vo), Vin is the input voltage, and Vo is the output voltage.

12. The control method according to claim 11, wherein if the absolute value of the adjustment value corresponding to the kth flying capacitor is greater than |D−$D_{ccm}$|, the control method further comprises: (d) adjusting a phase-shift angle between the kth main switch and the (k+1)th main switch to decrease a current flowing through the inductor to zero.

13. A multi-level AC-DC conversion circuit, wherein the number of levels of the multi-level AC-DC conversion circuit is N which is an integer greater than or equal to three, and the multi-level AC-DC conversion circuit comprises:

a first input terminal and a second input terminal, configured to receive an input voltage;

a first output terminal and a second output terminal, configured to provide an output voltage;

an inductor, having a first terminal electrically connected to the second input terminal;

N−1 lower switches, connected in series between a second terminal of the inductor and the second output terminal, wherein the first lower switch and the (N−1)th lower switch are coupled to the second terminal of the inductor and the second output terminal respectively;

N−1 upper switches, connected in series between the second terminal of the inductor and the first output terminal, wherein the first upper switch and the (N−1)th upper switch are coupled to the second terminal of the inductor and the first output terminal respectively;

N−2 flying capacitors, wherein the kth flying capacitor is connected between a common connection node of the kth lower switch and the (k+1)th lower switch and a common connection node of the kth upper switch and the (k+1)th upper switch, and k is a positive integer less than or equal to N−2;

a first input switch and a second input switch, wherein the first input switch is coupled between the first input terminal and the first output terminal, the second input switch is coupled between the first input terminal and the second output terminal, and a control signal of the first input switch is complementary to a control signal of the second input switch; and a control unit, wherein when the multi-level AC-DC conversion circuit works in a DCM, the control unit is configured to:

determine the N−1 lower switches and the N−1 upper switches as N−1 main switches and N−1 synchronous rectification switches respectively when a potential at the first input terminal is lower than a potential at the second input terminal, and determine the N−1 upper switches and the N−1 lower switches as N−1 main switches and N−1 synchronous rectification switches respectively when the potential at the first input terminal is higher than the potential at the second input terminal;

acquire an adjustment value corresponding to each of the N−2 flying capacitors according to an actual voltage and a reference voltage of the flying capacitor; and adjust a duty ratio of the kth main switch according to the adjustment value corresponding to the flying capacitor connected to the kth main switch, and adjust a duty ratio of the (N−1)th main switch according to the adjustment value corresponding to the flying capacitor connected to the (N−1)th main switch, wherein regarding each of the N−1 main switches, the duty ratio is adjusted by a first adjustment amount when D<(N−2)/(N−1), the duty ratio is adjusted by a second adjustment amount when (N−2)/(N−1)<D≤1, a product of the first adjustment amount and the second adjustment amount is negative, and D is the duty ratio of the N−1 main switches before the adjustment.

14. The multi-level AC-DC conversion circuit according to claim 13, wherein as the control unit adjusts the duty ratio of the main switch, when D<(N−2)/(N−1), $$D_k = D_k + (\Delta d_{k-1} - \Delta d_k)$$

$$D_{k+1} = D_{k+1} + (\Delta d_k - \Delta d_{k+1}),$$

when (N−2)/(N−1)<D≤1, $$D_k = D_k - (\Delta d_{k-1} - \Delta d_k)$$

$$D_{k+1} = D_{k+1} - (\Delta d_k - \Delta d_{k+1}),$$

where $D_k$ and $D'_k$ are the duty ratios of the kth main switch before and after the adjustment respectively, $D_{k+1}$ and $D'_{k+1}$ are the duty ratios of the (k+1)th main switch before and after the adjustment respectively, $D_k = D_{k+1} = D$, and $\Delta d_{k-1}$, $\Delta d_k$ and $\Delta d_{k+1}$ are the adjustment values corresponding to the (k−1)th, kth and (k+1)th flying capacitors respectively, wherein $\Delta d_{k-1}$ is zero when k equals 1, and $\Delta d_{k+1}$ is zero when k equals N−2.

15. The multi-level AC-DC conversion circuit according to claim 13, wherein an absolute value of the adjustment value corresponding to each of the N−2 flying capacitors is less than or equal to $|D-D_{ccm}|$, where $D_{ccm}=1-(Vin/Vo)$, Vin is the input voltage, and Vo is the output voltage.

16. The multi-level AC-DC conversion circuit according to claim 15, wherein if the absolute value of the adjustment value corresponding to the kth flying capacitor is greater than $|D-D_{ccm}|$, the control unit is further configured to adjust a phase-shift angle between the kth main switch and the (k+1)th main switch to decrease a current flowing through the inductor to zero.

* * * * *